US012738202B2

(12) United States Patent
Moon

(10) Patent No.: US 12,738,202 B2
(45) Date of Patent: Sep. 15, 2026

(54) TIMING CONTROLLER AND DISPLAY DEVICE INCLUDING THE SAME

(71) Applicant: LG Display Co., Ltd., Seoul (KR)

(72) Inventor: Kyeong Min Moon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/062,748

(22) Filed: Feb. 25, 2025

(65) Prior Publication Data

US 2025/0273132 A1 Aug. 28, 2025

(30) Foreign Application Priority Data

Feb. 28, 2024 (KR) ........................ 10-2024-0029095

(51) Int. Cl.
*G09G 3/32* (2016.01)

(52) U.S. Cl.
CPC ......... *G09G 3/32* (2013.01); *G09G 2310/027* (2013.01); *G09G 2310/08* (2013.01); *G09G 2320/0276* (2013.01)

(58) Field of Classification Search
CPC ............. G09G 3/32; G09G 2320/0276; G09G 2310/08; G09G 2310/027
See application file for complete search history.

(56) References Cited

U.S. PATENT DOCUMENTS 7,119,773 B2 * 10/2006 Kim ..................... G09G 3/3233 345/63
9,905,159 B2 * 2/2018 Genoe .................. G09G 3/3258
11,798,465 B2 * 10/2023 Kim ......................... G09G 3/32
11,810,522 B2 * 11/2023 Byun ....................... G09G 3/32
12,307,944 B2 * 5/2025 Kyles ..................... G09G 5/003
2006/0170623 A1 * 8/2006 Naugler ............... G09G 3/2011 345/76
2015/0054862 A1 * 2/2015 Kaplan ................ G09G 3/2022 345/691
2015/0302795 A1 * 10/2015 Genoe .................. G09G 3/2025 345/691
2017/0193913 A1 * 7/2017 Lee ...................... G09G 3/3258
2021/0375193 A1 * 12/2021 Son ...................... G09G 3/3233
2023/0162664 A1 * 5/2023 Kim ..................... G09G 3/3266 345/55
2023/0230550 A1 * 7/2023 Byun ................... G09G 3/3291 345/204
2023/0237950 A1 * 7/2023 Sakariya .............. G09G 3/2018 345/691

FOREIGN PATENT DOCUMENTS

KR 20180002786 A 1/2018
KR 20230110931 A 7/2023

* cited by examiner

*Primary Examiner* — Olga V Merkoulova
(74) *Attorney, Agent, or Firm* — Seed Intellectual Property Law Group LLP

(57) ABSTRACT

Disclosed is a timing controller and a display device including the same. More specifically, the present disclosure relates to a timing controller which unequally sets a pulse width modulation (PWM) pulse width of each of one or more subframes corresponding to a gray level value of pixel data, thereby allowing the luminance of a display device to nonlinearly increase, and a display device including the same.

17 Claims, 18 Drawing Sheets

TIMING CONTROLLER AND DISPLAY DEVICE INCLUDING THE SAME

CROSS-REFERENCE TO RELATED APPLICATION

This application claims priority to and the benefit of Korean Patent Application No. 10-2024-0029095, filed on Feb. 28, 2024, the disclosure of which is incorporated herein by reference in its entirety.

BACKGROUND

Technical Field

The present embodiment relates to a timing controller and a display device including the same.

Description of Related Art

With the advancement of informatization, various display devices that can visualize information are being released. For example, liquid crystal displays (LCDs) and organic light-emitting diode (OLED) displays are being released.

Recently, display devices that use inorganic light-emitting diodes (LEDs) as pixel light-emitting elements are attracting attention as next-generation display devices.

An example of inorganic light-emitting display devices is a micro-LED display device that uses micro-LEDs as light-emitting elements. Here, the micro-LEDs may be LEDs with a size of 100 μm or less.

The description provided in the description of the related art section should not be assumed to be prior art merely because it is mentioned in or associated with the description of the related art section. The description of the related art section may include information that describes one or more aspects of the subject technology, and the description in this section does not limit the disclosure.

BRIEF SUMMARY

A pulse width modulation (PWM) driving method is used as a method of controlling the brightness of the inorganic light-emitting display device. In order to improve the image quality of an input image in the PWM driving method, the inorganic light-emitting display device may display the input image by time-dividing a unit frame corresponding to one image into a plurality of subframes.

Here, the input image may include a plurality of pieces of pixel data, and in the inorganic light-emitting display device, gray values of the pixel data may be divided and allocated to the plurality of subframes, and a PWM pulse width of each subframe may be set according to the allocated values. In general, in an inorganic light-emitting display device, since a PWM pulse width of each subframe is equally set, an accumulated value of PWM pulse widths of each subframe may linearly increase. Thus, the output luminance of the inorganic light-emitting display device also linearly increases. Here, the inorganic light-emitting display device uses a preset gamma curve when expressing gray level values of pixel data.

The inventors have recognized, in the related art, as the output luminance of the inorganic light-emitting display device linearly increases, a deviation from a gamma curve, which has nonlinear characteristics, occurs, which makes it not possible to accurately express gray level values of pixel data. The present disclosure is directed to providing a timing controller which unequally sets a pulse width modulation (PWM) pulse width of each of one or more subframes corresponding to a gray level value of pixel data, thereby allowing the luminance of a display device to nonlinearly increase, and a display device including the same.

The technical benefits of the present disclosure are not limited to those described above, and other benefits that are not described may become apparent to those of ordinary skill in the art based on the following descriptions.

According to an aspect of the present disclosure, there is provided a timing controller including a memory configured to store a plurality of subframe information obtained by time-dividing a unit frame period, a data analysis circuit configured to receive input image data from a host and check one pixel gray value which is a gray level value of one pixel data included in the input image data, and a pulse width setting circuit configured to set a pulse width modulation (PWM) pulse width of each of one or more subframes corresponding to the one pixel gray value unequally per each subframe.

According to another aspect of the present disclosure, there is provided a display device including a gate driver configured to supply a scan signal to scan lines of a display panel in response to a gate control signal, and a timing controller configured to time-divide a unit frame period, which is a period for displaying one image, into a plurality of subframes, unequally set a PWM pulse width of each of one or more subframes, which corresponds to one pixel gray level value data which is a gray level value of one pixel data included in input image data received from the outside, and allow the PWM pulse width for each subframe set for each of the one or more subframes to be included in the gate control signal to supply the PWM pulse width to the gate driver.

The timing controller may include a memory configured to store information of the plurality of subframes, a data analysis circuit configured to receive the input image data from a host and check the one pixel gray level value in the input image data, and a pulse width setting circuit configured to set the PWM pulse width of each of the one or more subframes corresponding to the pixel gray level value unequally for each subframe.

It is to be understood that both the foregoing general description and the following detailed description are exemplary and explanatory, and are intended to provide further explanation of the inventive concepts as claimed.

BRIEF DESCRIPTION OF THE SEVERAL VIEWS OF THE DRAWINGS

The above and other objects, features and advantages of the present disclosure will become more apparent to those of ordinary skill in the art by describing exemplary embodiments thereof in detail with reference to the accompanying drawings, in which.

Figure 1:
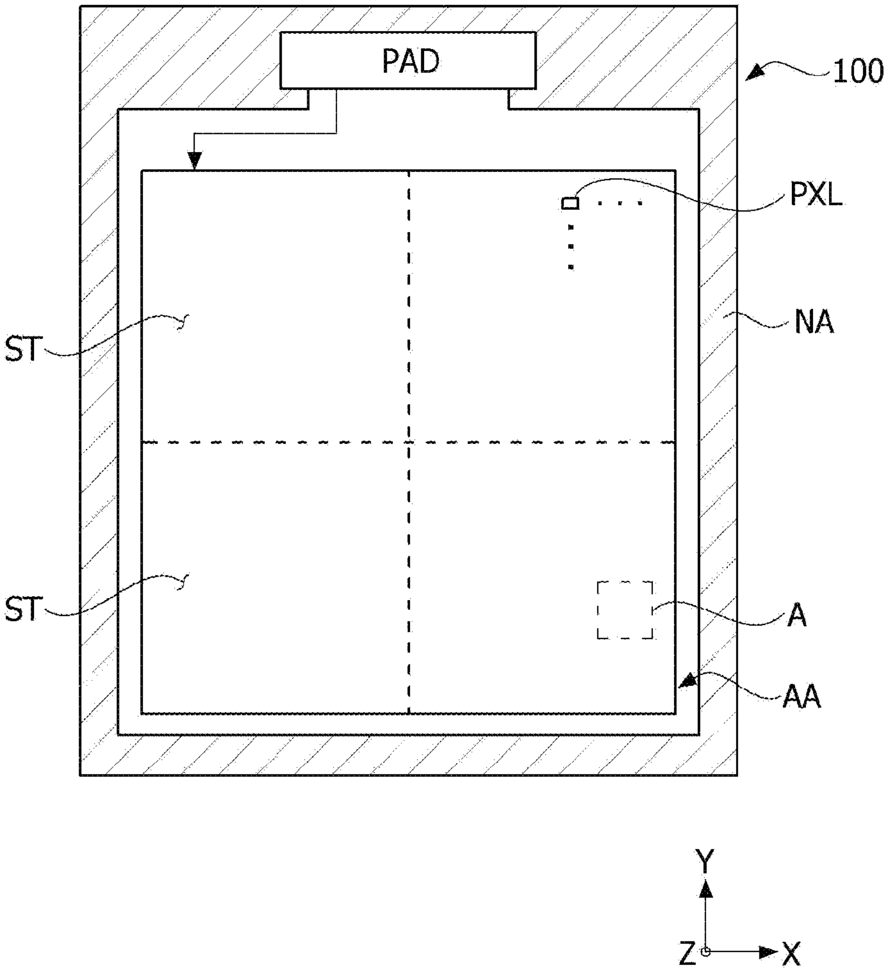
FIG. 1 is a view illustrating a display device according to one example embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. The progression of processing steps and/or operations described is an example; however, the sequence of steps and/or operations is not limited to that set forth herein and may be changed as is known in the art, with the exception of steps and/or operations necessarily occurring in a particular order. Names of the respective elements used in the following explanations may be selected only for convenience of writing the specification and may be thus different from those used in actual products.

The advantages and features of the present disclosure and methods of accomplishing the same will become apparent from the following description of the embodiments in detail, taken in conjunction with the accompanying drawings. The present disclosure is not limited to the embodiments disclosed herein but will be implemented in various forms. The embodiments are provided so that the present disclosure is completely disclosed, and a person of ordinary skilled in the art can fully understand the scope of the present disclosure. Therefore, the present disclosure will be defined only by the scope of the appended claims.

A shape, a size, a ratio, an angle, and a number disclosed in the drawings for describing embodiments of the present disclosure are merely an example, and thus, the present disclosure is not limited to the illustrated details. The same reference numerals refer to substantially the same components throughout the disclosure. In addition, in describing the present disclosure, when it is determined that the specific description of the known related art unnecessarily obscures the gist of the present disclosure, the detailed description thereof will be omitted.

The shapes, sizes, dimensions (e.g., length, width, height, thickness, radius, diameter, area, etc.), ratios, angles, numbers of elements, and the like illustrated in the accompanying drawings for describing the exemplary embodiments of the present disclosure are merely examples, and the present disclosure is not limited thereto. Like reference numerals generally denote like elements throughout the specification.

A dimension including size and a thickness of each component illustrated in the drawing are illustrated for convenience of description, and the present disclosure is not limited to the size and the thickness of the component illustrated, but it is to be noted that the relative dimensions including the relative size, location, and thickness of the components illustrated in various drawings submitted herewith are part of the present disclosure.

The terms such as "include," "have," "comprise," "contain," "constitute," "make up of," "formed of," and "consist of" used herein are generally intended to allow other components to be added unless the terms are used with the term "only." A singular expression can include a plural expression as long as it does not have an apparently different meaning in context.

Components are interpreted to include an ordinary error range even if not expressly stated.

When the position relationship and interconnection relationship between two components, such as "on", "above", "over", "below", "under", "beside", "beneath", "near", "close to," "adjacent to", "on a side of", "next" "connected or coupled," "crossing or intersecting," or the like, are described, one or more other components may be interposed between the components unless the term "immediately" or "directly" is described.

Spatially relative terms, such as "under," "below," "beneath", "lower," "over," "upper" and the like, may be used herein for ease of description to describe one element or feature's relationship to another element(s) or feature(s) as illustrated in the figures. It will be understood that the spatially relative terms can encompass different orientations of an element in use or operation in addition to the orientation depicted in the figures. For example, if an element in the figures is inverted, elements described as "below" or "beneath" other elements or features would then be oriented "over" the other elements or features. Thus, the exemplary term "below" can encompass both an orientation of below and above. Similarly, the exemplary term "above" or "over" can encompass both an orientation of "above" and "below".

When an element or layer is disposed "on" another element or layer, another layer or another element may be interposed directly on the other element or therebetween.

When the temporal relationship between two events is described using the terms "after," "following," "next," and "before", the two events may not occur in succession on the time axis as long as the term "immediately" or "directly" is not used.

Although the term "first," "second," or the like may be used in the front of the component to distinguish the components, functions or structures of the components are not limited by the ordinal number or component name. For convenience of description, ordinal numbers added to the front of the names of the same components may be different between embodiments.

The term "at least one" should be understood as including all possible combinations which can be suggested from one or more relevant items. For example, the meaning of "at least one of a first item, a second item, or a third item" may be each one of the first item, the second item, or the third item and also be all possible combinations that can be suggested from two or more of the first item, the second item, and the third item.

A term "device" used herein may refer to a display device including a display panel and a driver for driving the display panel. Examples of the display device may include a light emitting element, and the like. In addition, examples of the device may include a notebook computer, a television, a computer monitor, an automotive device, a wearable device, and an automotive equipment device, and a set electronic device (or apparatus) or a set device (or apparatus), for example, a mobile electronic device such as a smartphone or an electronic pad, which are complete products or final products respectively including light emitting element and the like, but embodiments of the present disclosure are not limited thereto.

The following embodiments may be partially or fully coupled or combined to each other, and various technological interworking and driving are possible. The embodiments may be implemented independently of each other and implemented together in the associated relationship.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein.

In the aspects of the present disclosure, a source electrode and a drain electrode are distinguished from each other, for convenience of description. However, the source electrode and the drain electrode are used interchangeably. The source electrode may be the drain electrode, and the drain electrode may be the source electrode. Also, the source electrode in any one aspect of the present disclosure may be the drain electrode in another aspect of the present disclosure, and the drain electrode in any one aspect of the present disclosure may be the source electrode in another aspect of the present disclosure.

Hereinafter, embodiments of the present disclosure will be described with reference to the accompanying drawings. In the specification, in adding reference numerals for elements in each drawing, it should be noted that like reference numerals already used to denote like elements in other drawings are used for elements wherever possible. In addition, the dimension scales of constituent elements shown in the drawings may be different from actual dimension scales, for convenience of description. That is, the dimension scales of constituent elements shown in the drawings should not be interpreted to be the same as those shown in the drawings.

Hereinafter, various embodiments of the present disclosure will be described in detail with reference to the accompanying drawings.

A display device according to one example embodiment of the present disclosure includes a display panel on which a display area or screen on which an image is displayed is disposed, and a driving circuit for driving pixels of the display panel. The display area includes a pixel area in which pixels are disposed. The pixel area includes a plurality of emission areas. A light-emitting element is disposed in each of the emission areas. A driving circuit may be built in the display panel.

Figure 2:
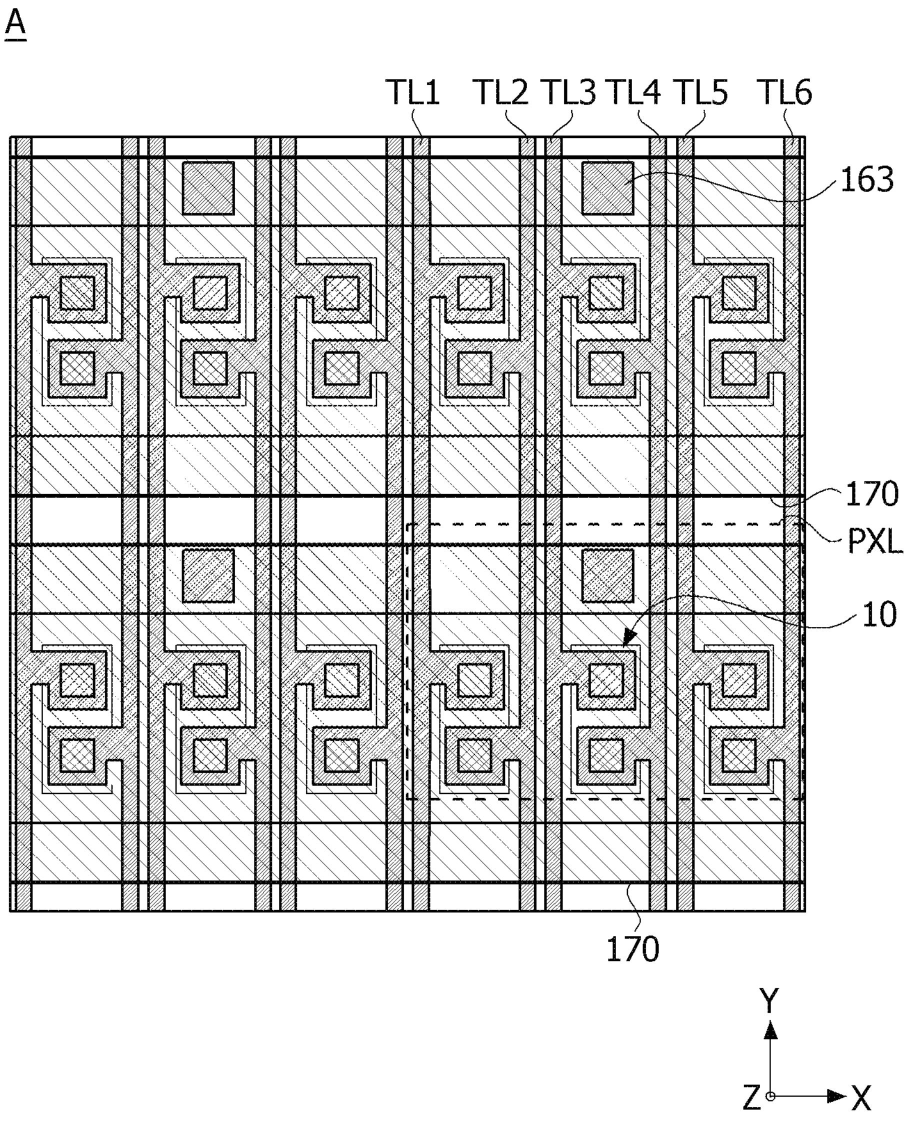
FIG. 2 is an enlarged view illustrating area A of FIG. 1.
Figure 3:
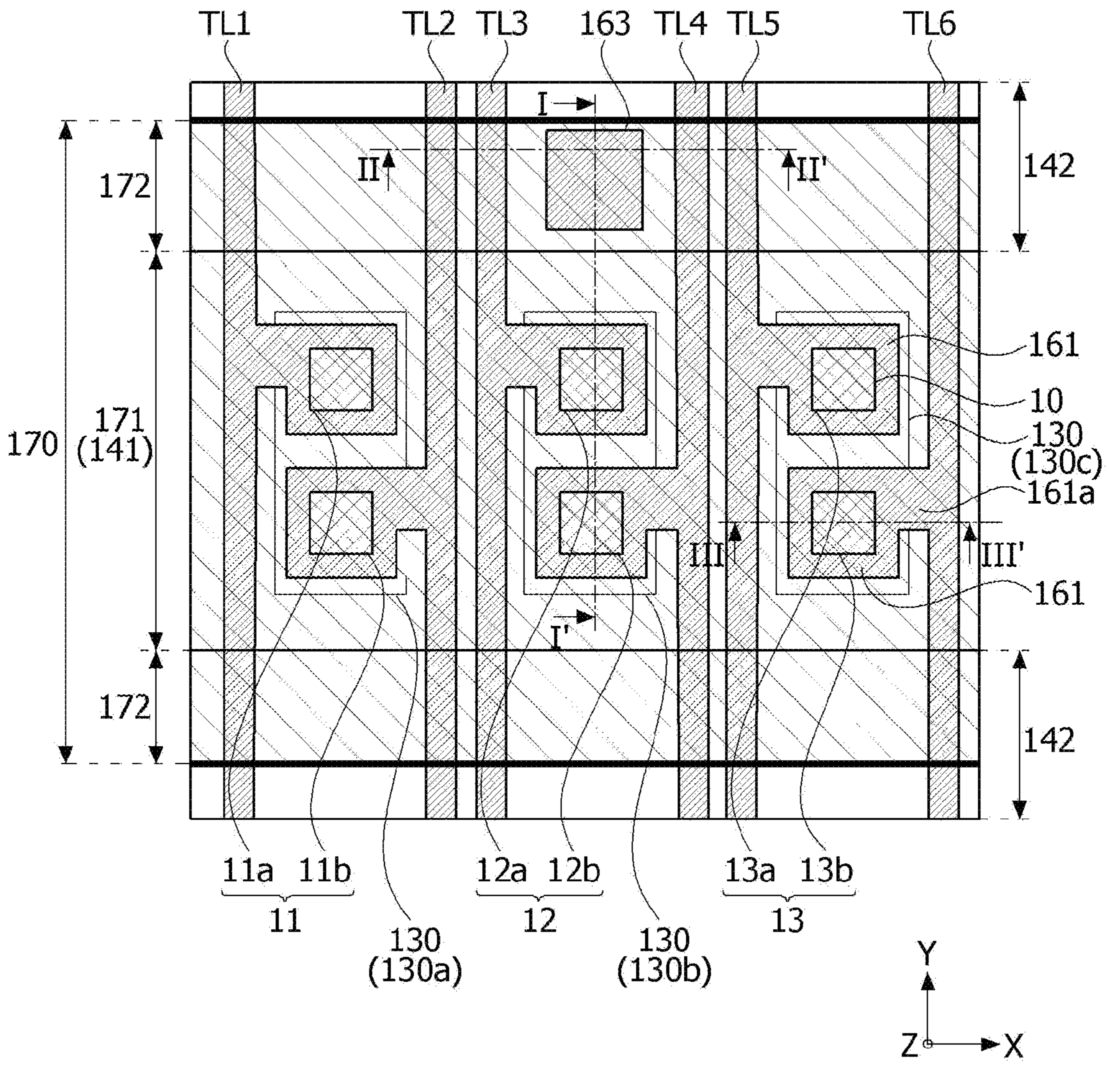
FIG. 3 is a view illustrating some areas of a pixel.

FIG. 1 is a view illustrating a display device according to one example embodiment of the present disclosure. FIG. 2 is an enlarged view illustrating area A of FIG. 1. FIG. 3 is a view illustrating some areas of a pixel.

Referring to FIGS. 1 and 2, a display device 100 according to one example embodiment of the present disclosure includes a display panel on which an input image is visually reproduced. The display panel may include a display area AA in which an image is displayed and a non-display area NA in which an image is not displayed. Various lines and driving circuits may be mounted in the non-display area NA, and a pad unit PAD to which an integrated circuit, a printed circuit, and the like are connected may be disposed.

The non-display area NA may be around the display area AA or may partially or fully surround the display area AA. The non-display area NA may be an area adjacent to the display area AA. Further, the non-display area NA may be an area disposed adjacent to the display area AA and configured to surround the display area AA. However, the present disclosure is not limited thereto.

A plurality of light-emitting elements 10 disposed in the display area AA to form pixels PXL may be micro-sized inorganic light-emitting elements. The inorganic light-emitting element may be grown on a silicon wafer and then attached to the display panel through a transfer process.

The transfer process of the light-emitting element 10 may be performed for each pre-partitioned area. In FIG. 1, the display area AA is illustrated as being partitioned into four transfer areas ST, but the size of the transfer areas or the number of partitions thereof is not limited thereto. The transfer process may be performed sequentially or simultaneously in first to fourth transfer area ST. In the transfer area ST, a blue light-emitting element 10, a green light-emitting element 10, and a red light-emitting element 10 may be sequentially transferred.

A data driving circuit or a gate driving circuit may be disposed in the non-display area NA, and lines to which a control signal for controlling such driving circuits is supplied may be disposed. Here, the control signal may include various timing signals including a clock signal, an input data enable signal, and synchronization signals (for example, a horizontal synchronization signal Hsync, and a vertical synchronization signal Vsync) and may be received through the pad unit PAD. Here, the horizontal synchronization signal is a signal representing a time taken to display one horizontal line of a screen and the vertical synchronization signal is a signal representing a time taken to display a screen of one frame. The data enable signal may correspond to a signal indicating a period for which a data voltage is supplied to the pixel.

The pixels PXL may be driven by a driving circuit. The driving circuit may receive a driving voltage, an image signal (digital signal), a synchronization signal synchronized with the image signal, and the like and may output an anode voltage and a cathode voltage of the light-emitting element 10 to drive a plurality of pixels. The driving voltage may be a high potential voltage EVDD. The cathode voltage may be a low potential voltage EVSS commonly applied to the pixels. The anode voltage may be a voltage corresponding to a pixel data value of the image signal. The driving circuit may be disposed in the non-display area NA or may be disposed below the display area AA.

Each pixel PXL may include a plurality of subpixels each having a different color. For example, the plurality of pixels may include a red subpixel including the light-emitting element 10 that emits light with a red wavelength, a green subpixel including the light-emitting element 10 that emits light with a green wavelength, and a blue subpixel including the light-emitting element 10 that emits light with a blue wavelength. The plurality of pixels may further include white sub-pixels.

Each of the plurality of subpixels SP is a minimum unit which configures the display area and n subpixels SP form one pixel. Each of the plurality of subpixels SP may emit light having different wavelengths from each other. The plurality of subpixels may include first to third subpixels which emit different color light from each other. Each pixel P may be divided into a red subpixel, a green subpixel, and a blue subpixel, for color rendering. Each pixel P may further include a white subpixel. The plurality of subpixels SP may be variously modified in colors and configurations, as necessary. However, the present disclosure is not limited thereto.

For example, the plurality of subpixels SP may include red, green, and blue subpixels, in which the red, green, and blue subpixels may be disposed in a repeated manner. Alternatively, the plurality of subpixels SP may include red, green, blue, and white subpixels, in which the red, green, blue, and white subpixels may be disposed in a repeated manner, or the red, green, blue, and white subpixels may be disposed in a quad type. For example, the red sub pixel, the blue sub pixel, and the green sub pixel may be sequentially disposed along a row direction, or the red sub pixel, the blue sub pixel, the green sub pixel and the white sub pixel may be sequentially disposed along the row direction. However, in the embodiment of the present disclosure, the color type, disposition type, and disposition order of the subpixels are not limiting, and may be configured in various forms according to light-emitting characteristics, device lifespans, and device specifications.

Meanwhile, the subpixels may have different light-emitting areas according to light-emitting characteristics. For example, a subpixel that emits light of a color different from that of a blue subpixel may have a different light-emitting area from that of the blue subpixel. For example, the red subpixel, the blue subpixel, and the green subpixel, or the red subpixel, the blue subpixel, the white subpixel, and the green subpixel may each has a different light-emitting area.

Referring to FIGS. 2 and 3, a plurality of pixels PXL may be consecutively disposed in a first direction (X-axis direction) and a second direction (Y-axis direction). A plurality of subpixels with the same color may be disposed in the pixel in a display area AA. For example, each of the plurality of pixels may include a first red subpixel in which a 1-1 light-emitting element 11*a* emitting light with a red wavelength is disposed, a second red subpixel in which a 1-2 light-emitting element 11*b* emitting light with a red wavelength is disposed, a first green subpixel in which a 2-1 light-emitting element 12*a* emitting light with a green wavelength is disposed, a second green subpixel in which a 2-2 light-emitting element 12*b* emitting light with a green wavelength is disposed, a first blue subpixel in which a 3-2 light-emitting element 13*a* emitting light with a blue wavelength is disposed, and a second blue subpixel in which a 3-2 light-emitting element 13*b* emitting light with a blue wavelength is disposed. The 1-1 light-emitting element 11*a*, the 2-1 light-emitting element 12*a*, and the 3-1 light-emitting element 13*a* may be interpreted as main light-emitting elements. The 1-2 light-emitting element 11*b*, the 2-2 light-emitting element 12*b*, and the 3-2 light-emitting element 13*b* can be interpreted as sub-light-emitting elements.

One subpixel may include at least one light-emitting element, and thus when one light-emitting element becomes defective, the luminance of the subpixel may be adjusted by increasing the luminance of other light-emitting elements. For example, one subpixel may include two light-emitting elements, when one light-emitting element becomes defective, the luminance of the subpixel may be adjusted by increasing the luminance of another light-emitting elements. Alternatively, one subpixel may include more than two light-emitting elements. However, the present disclosure is not necessarily limited thereto, and one subpixel may include only one light-emitting element.

A plurality of first electrodes 161 may each disposed below the light-emitting element 10 and may be optionally connected to a plurality of signal lines TL1 to TL6 by a connection portion 161*a*. A high potential voltage may be applied to the driving circuit through the signal lines TL1 to TL6. The signal lines TL1 to TL6 and the first electrodes 161 may be formed as electrode patterns integrated during an electrode pattern process.

For example, a first signal line TL1 may be connected to an anode of the first red subpixel, and a second signal line TL2 may be connected to an anode of the second red subpixel. A third signal line TL3 may be connected to an anode of the first green subpixel, and a fourth signal line TL4 may be connected to an anode of the second green subpixel. A fifth signal line TL5 may be connected to an anode of the first blue subpixel, and a sixth signal line TL6 may be connected to an anode of the second blue subpixel. When one subpixel includes only one light-emitting element, the number of signal lines TL may be reduced by half.

A second electrode 170 may be a cathode that is disposed in each row to apply a cathode voltage to the light-emitting elements 10 consecutively disposed in the first direction (X-axis direction). A plurality of second electrodes 170 may be disposed to be spaced apart from each other in the second direction (Y-axis direction). A cathode voltage may be applied to the plurality of second electrodes 170 through a contact electrode 163. The plurality of second electrodes 170 may be electrically connected to the contact electrode 163, respectively. However, the present disclosure is not necessarily limited thereto, and the second electrode 170 may be provided as one electrode layer rather than being divided into a plurality of pieces and may function as a common electrode.

For example, the first electrodes 161 may be an electrode disposed in each subpixel SP, and the second electrode 170 may be an electrode commonly disposed in all the subpixels SP. For example, the first electrodes 161 may be an anode, and the second electrode 170 may be a cathode, however, the present disclosure is not limited thereto.

Figure 4:
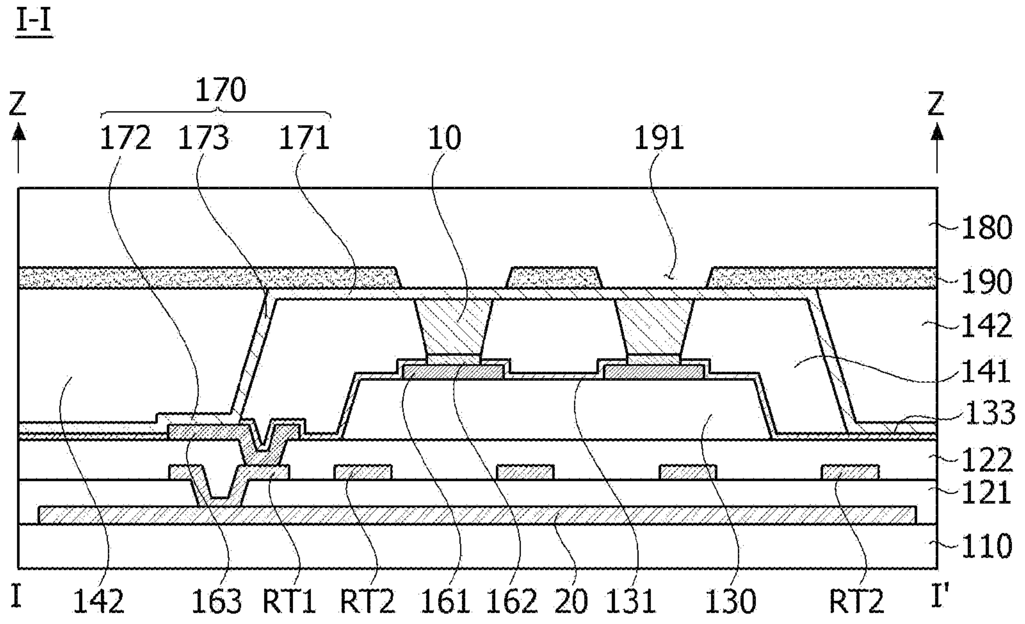
FIG. 4 is a cross-sectional view along line I-I' of FIG. 3.
Figure 5:
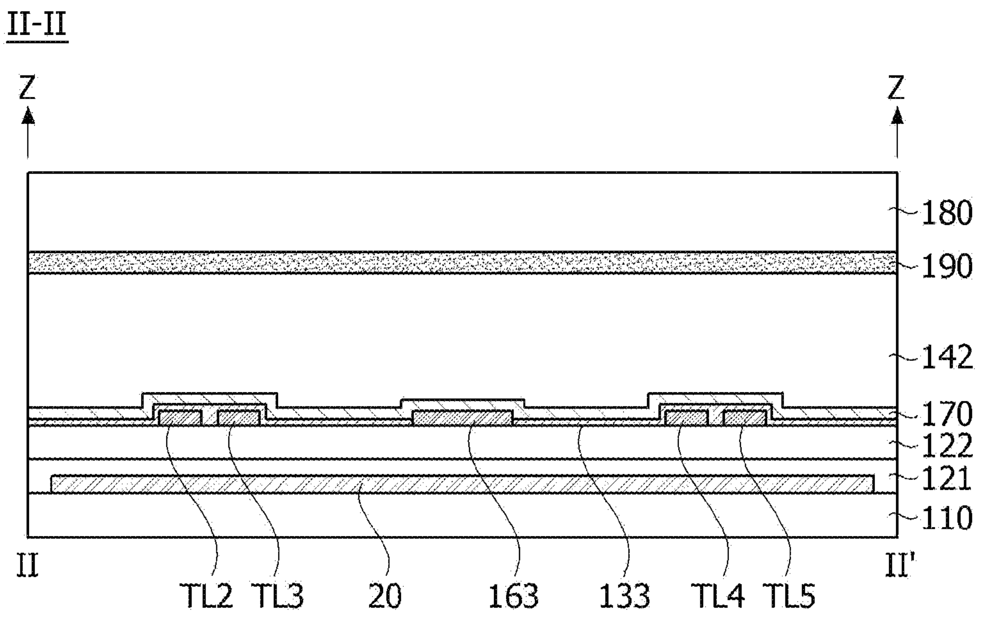
FIG. 5 is a cross-sectional view along line II-II' of FIG. 3.
Figure 6:
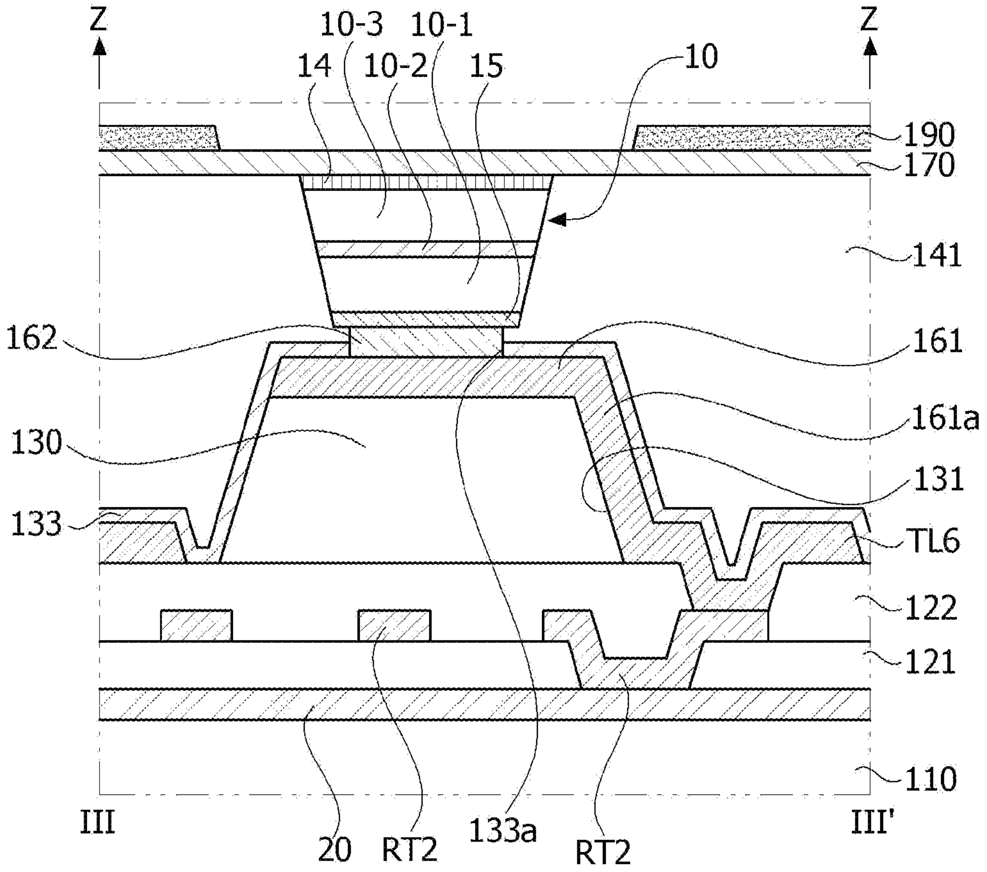
FIG. 6 is a cross-sectional view along line III-III' of FIG. 3.
Figure 7:
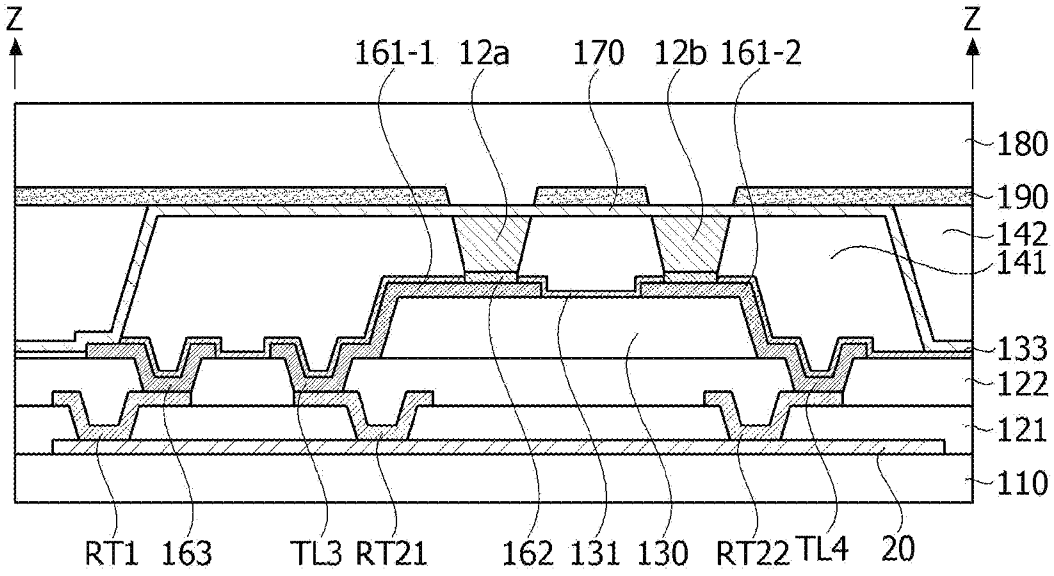
FIG. 7 is a cross-sectional view illustrating an example in which a main light-emitting element and a sub-light-emitting element are electrically connected to a pixel driving circuit.

FIG. 4 is a cross-sectional view along line I-I' of FIG. 3. FIG. 5 is a cross-sectional view along line II-II' of FIG. 3. FIG. 6 is a cross-sectional view along line III-III' of FIG. 3. FIG. 7 is a cross-sectional view illustrating an example in which two light-emitting elements are connected to a driving circuit.

Referring to FIGS. 3 to 5, a display device according to an example embodiment includes a plurality of first electrodes 161 and a plurality of contact electrodes 163 which are disposed on a substrate 110, a plurality of light-emitting elements 10 disposed on the plurality of first electrodes 161, a first optical layer 141 disposed between the plurality of light-emitting elements 10, and a second electrode 170 disposed on the plurality of light-emitting elements 10.

The substrate 110 may be made of plastic having flexibility. For example, the substrate 110 may be manufactured as a single-layer or multi-layer substrate made of a material selected from polyimide, polyethylene terephthalate, polyethylene naphthalate, polycarbonate, polyethersulfone, polyarylate, polysulfone, and a cyclic-olefin copolymer, but the present disclosure is not limited thereto. For example, the substrate 110 may be a ceramic substrate or a glass substrate.

A driving circuit 20 may be disposed in a display area AA of the substrate 110. The driving circuit 20 may include a plurality of thin film transistors.

Active layers of the thin-film transistors TFTs may be formed of a semiconductor material, such as an oxide semiconductor, amorphous semiconductor, or polycrystalline semiconductor, but is not limited thereto.

The oxide semiconductor material may have an excellent effect of preventing a leakage current and relatively inexpensive manufacturing cost. The oxide semiconductor may be made of a metal oxide such as zinc (Zn), indium (In), gallium (Ga), tin (Sn), and titanium (Ti) or a combination of a metal such as zinc (Zn), indium (In), gallium (Ga), tin (Sn), or titanium (Ti) and its oxide. Specifically, the oxide semiconductor may include zinc oxide (ZnO), zinc-tin oxide (ZTO), zinc-indium oxide (ZIO), indium oxide (InO), titanium oxide (TiO), indium-gallium-zinc oxide (IGZO), indium-zinc-tin oxide (IZTO), indium zinc oxide (IZO), indium gallium tin oxide (IGTO), and indium gallium oxide (IGO), but is not limited thereto.

The polycrystalline semiconductor material has a fast movement speed of carriers such as electrons and holes and thus has high mobility, and has low energy power consumption and superior reliability. The polycrystalline semiconductor may be made of polycrystalline silicon (poly-Si), but is not limited thereto.

The amorphous semiconductor material may be made of amorphous silicon (a-Si), but is not limited thereto.

The driving circuit 20 may include at least one driving thin film transistor, at least one switching thin film transistor, and at least one storage capacitor. When the driving circuit 20 includes a plurality of thin film transistors, the plurality of thin film transistors may be formed on the substrate 110 through a thin film transistor (TFT) manufacturing process. In an example embodiment, the driving circuit 20 may be a general term for a plurality of thin film transistors electrically connected to the light-emitting element 10.

The driving circuit 20 may be a micro-driver manufactured on a single crystal semiconductor substrate 110 using a metal-oxide-silicon field effect transistor (MOSFET) manufacturing process. The micro-driver may include a plurality of driving circuits to drive a plurality of subpixels. When the driving circuit 20 is implemented as a micro-driver, after an adhesive layer is disposed on the substrate 110, the micro-driver may be mounted on the adhesive layer through a transfer process.

A buffer layer 121 covering the driving circuit 20 may be disposed on the substrate 110. The buffer layer 121 may be made of an organic insulating material, for example, photosensitive photo acryl or photosensitive polyimide, but the present disclosure is not limited thereto.

The buffer layer 121 may be used by stacking inorganic insulating materials such as silicon nitride (SiNx) or silicon oxide (SiO2) in a plurality of layers or may be used by stacking organic insulating materials and inorganic insulating materials in a plurality of layers. For example, the buffer layer 121 may be formed by inorganic film in a single layer or in multiple layers, for example, the inorganic film in a single layer may be a silicon oxide (SiOx) film or a silicon nitride (SiNx) film, and inorganic films in multiple layers may formed by alternately stacking one or more silicon oxide (SiOx) films, one or more silicon nitride (SiNx) films, and one or more amorphous silicon (a-Si), but the present disclosure is not limited thereto. However, the buffer layer 121 may be excluded in accordance with the structure or properties of the display device.

An insulating layer 122 may be disposed on the buffer layer 121. The insulating layer 122 may be made of an organic insulating material, for example, photosensitive photo acryl or photosensitive polyimide, but the present disclosure is not limited thereto. Connection lines RT1 and RT2 may be disposed on the buffer layer 121. The connection lines RT1 and RT2 may be connected to corresponding signal lines TL1 to TL6 or may be connected to the signal lines TL1 to TL6. The connection lines RT1 and RT2 may include a plurality of line patterns disposed on different layers with one or more insulating layers therebetween. The line patterns disposed on different layers may be electrically connected through a contact hole passing through the insulating layer.

A plurality of bank patterns 130 may be disposed on the insulating layer 122. At least one light-emitting element 10 may be disposed on each bank pattern 130. For example, a first light-emitting element 11 may be disposed on the first bank pattern 130, a second light-emitting element 12 may be disposed on a second bank pattern 130, and a third light-emitting element 13 may be disposed on a third bank pattern 130.

The bank pattern 130 may be made of an organic insulating material, for example, photosensitive photo acryl or photosensitive polyimide, but the present disclosure is not limited thereto. The bank pattern 130 may guide a position at which the light-emitting element 10 is to be attached during a transfer process of the light-emitting element 10. The bank pattern 130 may be omitted.

A bank pattern 130 may be disposed on the first electrode 161. The bank pattern 130 may be disposed at a boundary between the plurality of subpixels SP and suppress a color mixture of light beams from the plurality of subpixels SP. The bank pattern 130 can cover the edge of first electrode 161 and can be formed to expose a portion of first electrode 161. Accordingly, bank pattern 130 can prevent a current from being concentrated at an end of first electrode 161 so that it is possible to prevent a deterioration of light emitting efficiency. The opening of the bank pattern 130 may expose a portion of the first electrode 161 to form the emission area. For example, the opening of the bank pattern 130 may overlap a portion of the first electrode 161. The bank pattern 130 may be formed of a material including a black pigment, or an organic material such as a benzocyclobutene resin, a polyimide resin, an acrylic resin, or a photosensitive polymer, but example embodiments of the disclosure are not limited thereto. When the bank pattern 130 is formed of a material including a black pigment, a black dye, or the like, it may be a black bank. When the bank pattern 130 is formed of a material including a black pigment or a black dye, light from the outside may be blocked or light reflected from the outside may be blocked, and thus the luminance of the display device may be further enhanced.

A solder pattern 162 may be disposed on the first electrode 161. The solder pattern 162 may be made of indium (In), tin (Sn), or an alloy thereof, but the present disclosure is not limited thereto.

The plurality of light-emitting elements 10 may be mounted on the solder pattern 162, respectively. One pixel may include the light-emitting elements 10 having three colors. The first light-emitting element 11 may be a red light-emitting element, the second light-emitting element 12 may be a green light-emitting element, and the third light-emitting element 13 may be a blue light-emitting element. However, the present disclosure is not limited thereto, the one pixel may also include a white light-emitting element. In addition, two or more light-emitting elements may be installed in each subpixel. Alternatively, only one light-emitting element may be installed in each subpixel.

The first optical layer 141 may cover the plurality of light-emitting elements 10 and the bank patterns 130. Accordingly, the first optical layer 141 may cover a space between the plurality of light-emitting elements 10 and a space between the plurality of bank patterns 130. The first optical layers 141 may extend in a first direction (for example, X-axis direction) and may be spaced apart from each other in a second direction (for example, Y-axis direction) and divided between pixel rows.

The first optical layer 141 may include an organic insulating material in which fine metal particles such as titanium dioxide particles are dispersed. Light emitted from the plurality of light-emitting elements 10 may be scattered by the fine metal particles dispersed in the first optical layer 141 and emitted to the outside.

The second electrode 170 may be disposed on the plurality of light-emitting elements 10. The second electrode 170 may be commonly connected to a plurality of pixels PXL. The second electrode 170 may be a thin electrode that transmits light. The second electrode 170 may be made of a transparent electrode material, for example, indium tin oxide (ITO), but the present disclosure is not necessarily limited thereto.

The second electrodes 170 may extend in the first direction (for example, the X-axis direction) and may be spaced apart from each other in the second direction (for example, Y-axis direction). The second electrode 170 may include a first area 171 disposed on an upper surface of the light-emitting element 10 and an upper surface of the first optical layer 141, a second area 172 in contact with the contact electrode 163 and electrically connected to the contact electrode 163, and a third area 173 disposed on a side surface of the first optical layer 141 to connect the first area 171 and the second area 172.

In a plan view, a plurality of second electrodes 170 may each overlap the first optical layer 141, and the second area 172 may cover an outer planar surface of the first optical layer 141.

A second optical layer 142 may be made of an organic insulating material to surround a periphery of the first optical layer 141. The second optical layer 142 may be disposed on the insulating layer 122 together with the first optical layer 141. The first optical layer 141 and the second optical layer 142 may include the same material (for example, siloxane). For example, the first optical layer 141 may be made of siloxane including titanium oxide (TiOx), and the second optical layer 142 may be made of siloxane not including titanium oxide (TiOx). However, the present disclosure is not necessarily limited thereto, and the first optical layer 141 and the second optical layer 142 may be made of the same material or different materials.

According to an example embodiment, since the second area 172 of the second electrode 170 is connected to the contact electrode 163 in a state in which the entirety of the second area 172 is formed to be flat, excessive stress is not concentrated at a point at which the second area 172 is connected to the contact electrode 163. Accordingly, it is possible to effectively prevent cracks from occurring in the second electrode 170.

The second optical layer 142 may cover the second area 172 and the third area 173 of the second electrode 170. An upper surface of the second optical layer 142 may be coplanar with an upper surface of the first area 171 of the second electrode 170. That is, the first optical layer 141 and the second optical layer 142 may function as planarization layers. Thus, since there is no step on a surface on which a black matrix 190 is formed, patterns of the black matrix 190 may be easily formed on the first optical layer 141 and the second optical layer 142. However, the present disclosure is not necessarily limited thereto, and the upper surfaces of the second optical layer 142 and the second electrode 170 may have different heights.

The black matrix 190 may be made of an organic insulating material to which a black pigment is added. The second electrode 170 may be in contact with the contact electrode 163 below the black matrix 190. A transmission hole 191 through which light emitted from the light-emitting element 10 is emitted to the outside may be formed between the patterns of the black matrix 190. A problem in that pieces of light emitted from adjacent light-emitting elements 10 through the first optical layer 141 may be solved by the black matrix 190.

A cover layer 180 may be made of an organic insulating material to cover the black matrix 190 and the second electrode 170. In FIG. 3, the configuration of the black matrix 190 and the cover layer 180 is omitted.

The contact electrode 163 may be electrically connected to a first connection line RT1 disposed therebelow, and the first connection line RT1 may be connected to the driving circuit 20. Therefore, a cathode voltage may be applied to the second electrode 170 through the contact electrode 163. The first electrode 161 may be electrically connected to a second connection line RT2. This will be described below.

Referring to FIG. 5, the contact electrode 163 may be coplanar with the signal lines TL1 to TL6. The driving circuit 20 may be disposed below the contact electrode 163 and the signal lines TL1 to TL6. When the driving circuit 20 is a micro-driver, a plurality of micro-drivers may be disposed in a display panel.

A passivation layer 133 may expose the contact electrode 163 such that the contact electrode 163 and the second electrode 170 are electrically connected. In addition, the passivation layer 133 may insulate the signal line TL2 to TL5 from the second electrode 170.

Referring to FIG. 6, a connection portion 161*a* of the first electrode 161 may extend to one side surface 131 of the bank pattern 130 to be electrically connected to the connection line RT2 disposed on the insulating layer 122.

The first electrode 161, the connection portion 161*a*, the signal line TL, and/or the connection lines RT1 and RT2 may include a single-layer or multi-layer metal layer made of a material selected from titanium (Ti), molybdenum (Mo), and aluminum (Al). The first electrode 161, the connection portion 161*a*, the signal line TL, and/or the connection lines RT1 and RT2 may be formed as a multilayer structure including a first layer ML1, a second layer ML2, a third layer ML3, and a fourth layer ML4.

The first layer ML1 and the third layer ML3 may include titanium (Ti) or molybdenum (Mo). The second layer ML2 may include aluminum (Al). The fourth layer ML4 may include a transparent conductive oxide layer made of indium tin oxide (ITO) or indium zinc oxide (IZO) which has high adhesiveness to the solder pattern 162 and has corrosion resistance and acid resistance.

The first layer ML1, the second layer ML2, the third layer ML3, and the fourth layer ML4 may be sequentially deposited and then patterned by performing a photolithography process and an etching process.

The passivation layer 133 may be disposed on the first electrode 161 and the signal line TL and may include an opening 133*a* that exposes the solder pattern 162.

The light-emitting element 10 may include a first conductive-type semiconductor layer 10-1, an active layer 10-2 disposed on the first conductive-type semiconductor layer 10-1, and a second conductive-type semiconductor layer 10-3 disposed on the active layer 10-2. A first driving electrode 15 may be disposed below the first conductive-type semiconductor layer 10-1, and a second driving electrode 14 may be disposed on the second conductive-type semiconductor layer 10-3.

The light-emitting element 10 may be formed on a silicon wafer using a method including metal organic chemical vapor deposition (MOCVD), chemical vapor deposition (CVD), plasma-enhanced chemical vapor deposition (PECVD), molecular beam epitaxy (MBE), hydride vapor phase epitaxy (HVPE), or sputtering.

The first conductive-type semiconductor layer 10-1 may be implemented using a Group III-V or Group II-VI compound semiconductor or the like and may be doped with a first dopant. The first conductive-type semiconductor layer 10-1 may be made of at least one selected from a semiconductor material having a composition formula of $Al_{x1}In_{y1}Ga_{(1-x1-y1)}N$ ($0 \le x1 \le 1$, $0 \le y1 \le 1$, and $0 \le x1+y1 \le 1$), InAlGaN, AlGaAs, GaP, GaAs, GaAsP, and AlGaInP, but the present disclosure is not limited thereto. When the first dopant is an n-type dopant such as Si, Ge, Sn, Se, or Te, the first conductive-type semiconductor layer 10-1 may be an n-type nitride semiconductor layer. However, when the first dopant is a p-type dopant, the first conductive-type semiconductor layer 10-1 may be a p-type nitride semiconductor layer.

The active layer 10-2 is a layer on which electrons (or holes) injected through the first conductive-type semiconductor layer 10-1 meet holes (or electrons) injected through the second conductive-type semiconductor layer 10-3. As electrons and holes recombine, while an energy level transitions to a lower energy level, the active layer 10-2 may generate light with a corresponding wavelength.

The active layer 10-2 may have any one structure of a single well structure, a multi-well structure, a single quantum well structure, a multi-quantum well (MQW) structure, a quantum dot structure, and a quantum line structure, and the structure of the active layer 10-2 is not limited thereto. The active layer 10-2 may generate light in a visible light wavelength range. For example, the active layer 10-2 may output light with a wavelength range of any one of blue, green, and red.

The second conductive-type semiconductor layer 10-3 may be disposed on the active layer 10-2. The second conductive-type semiconductor layer 10-3 may be implemented using a Group III-V or Group II-VI compound semiconductor or the like and may be doped with a second dopant. The second conductive-type semiconductor layer 10-3 may be made of a semiconductor material having a composition formula of $Al_{x2}In_{y2}Ga_{(1-x2-y2)}N$ ($0 \le x2 \le 1$, $0 \le y2 \le 1$, and $0 \le x2+y2 \le 1$) or a material selected from AlInN, AlGaAs, GaP, GaAs, GaAsP, and AlGaInP. When the second dopant is a p-type dopant such as Mg, Zn, Ca, Sr, or Ba, the second conductive-type semiconductor layer 10-3 doped with the second dopant may be a p-type semiconductor layer. When the second dopant is an n-type dopant, the second conductive-type semiconductor layer 10-3 may be an n-type nitride semiconductor layer.

A reflection layer 16 may be disposed on a side surface and a lower surface of the light-emitting element 10. The reflection layer 16 may have a structure in which a reflection material is dispersed in a resin layer, but the present disclosure is not necessarily limited thereto. For example, the reflection layer 16 may be manufactured as a reflector with various structures. Light emitted from the active layer 10-2 may be reflected upward by the reflection layer 16, thereby increasing light extraction efficiency.

In the embodiment, a vertical structure in which the driving electrodes 14 and 15 are disposed on and below a light-emitting structure has been described, but the light-emitting element may have a lateral structure or a flip chip structure in addition to the vertical structure.

Referring to FIG. 7, a main light-emitting element 12*a* and a sub-light-emitting element 12*b* of a subpixel may be disposed on the bank pattern 130. The second light-emitting element 12 is described as an example. A 1-1 electrode 161-1 connected to the main light-emitting element 12*a* may be electrically connected to a 2-1 connection line RT21 that extends to one side surface of the bank pattern 130 and is disposed therebelow. A 1-2 electrode 161-2 connected to the sub-light-emitting element 12*b* may be electrically connected to a 2-2 connection line RT22 that extends to the other side surface of the bank pattern 130 and is disposed therebelow.

The driving circuit 20 may apply an anode voltage to the main light-emitting element 12*a* through the 2-1 connection line RT21 and may apply an anode voltage to the sub-light-emitting element 12*b* through the 2-2 connection line RT22. The driving circuit 20 may apply a cathode voltage to the main light-emitting element 12*a* and the sub-light-emitting element 12*b* through the first connection line RT1 and the second electrode 170.

When the main light emitting element 12*a* is normal, the driving circuit 20 may adjust luminance by driving only the main light emitting element 12*a*. When the main light emitting element 12*a* is defective, luminance may be adjusted by driving only the sub-light emitting element 12*b*. However, the present disclosure is not limited thereto.

Figure 8:
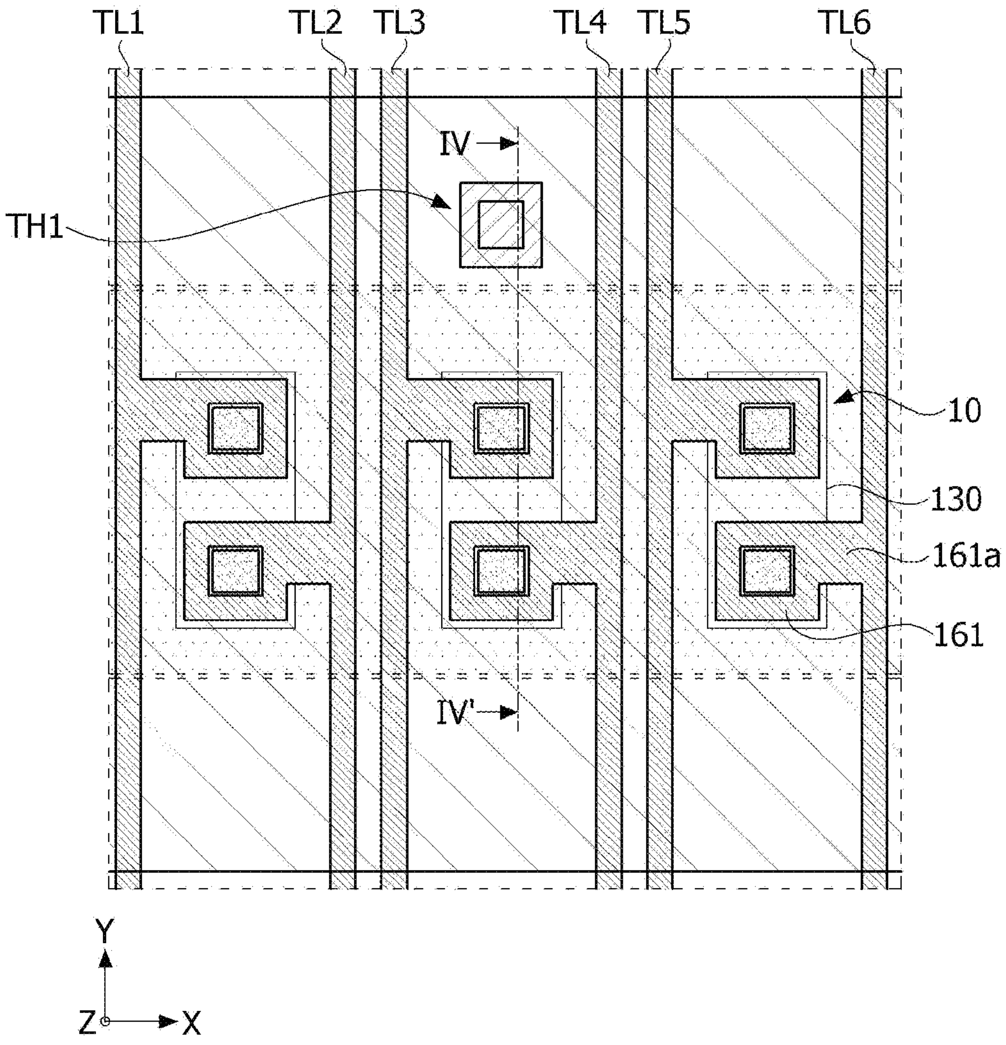
FIG. 8 is a view illustrating a display device according to another example embodiment of the present disclosure.
Figure 9:
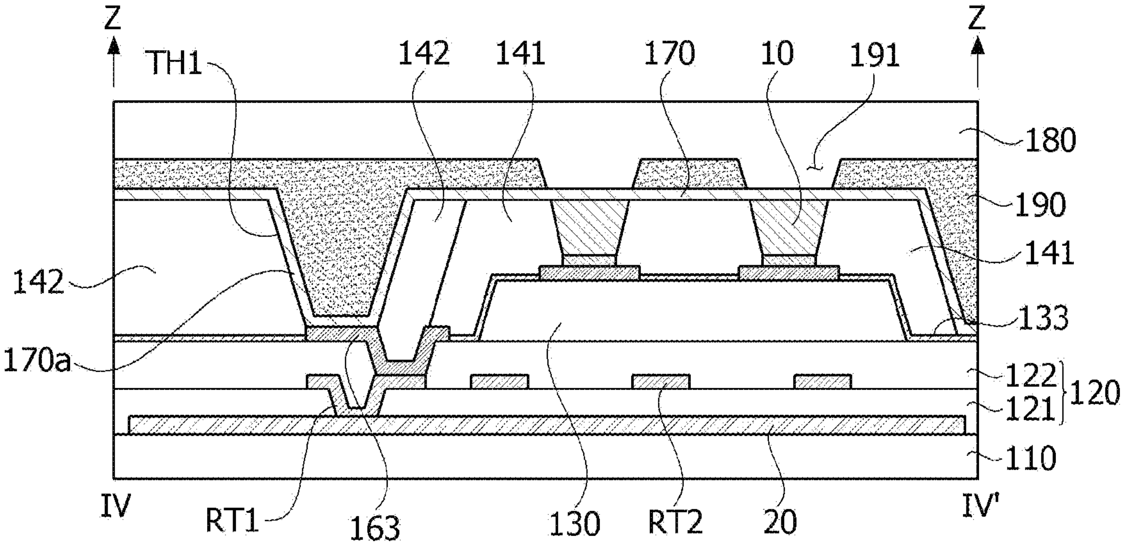
FIG. 9 is a cross-sectional view along line IV-IV' of FIG. 8.

FIG. 8 is a view illustrating a display device according to another example embodiment of the present disclosure. FIG. 9 is a cross-sectional view along line IV-IV' of FIG. 8.

Referring to FIGS. 8 and 9, a second electrode 170 may be electrically connected to a contact electrode 163 through a contact hole TH1 formed in a second optical layer 142. The second optical layer 142 may include the contact hole TH1 exposing the contact electrode 163. The second electrode 170 may be inserted into the contact hole TH1 of the second optical layer 142 and may be in contact with an upper surface of the contact electrode 163. The contact hole TH1 may be formed in an outer area of a pixel.

Figure 10:
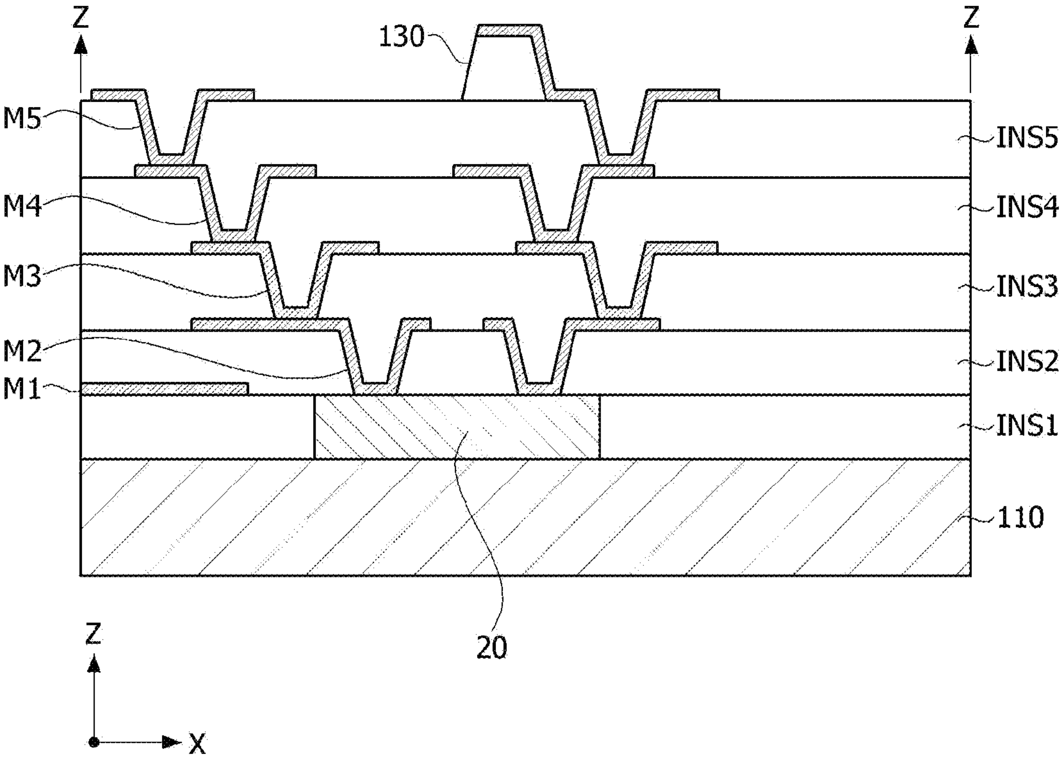
FIG. 10 is a schematic cross-sectional view of a display panel illustrating an example of multilayer line patterns.

FIG. 10 is a cross-sectional view of a display panel which schematically illustrates an example of multilayer line patterns that may be applied to one example embodiment of the present disclosure.

Referring to FIG. 10, first to fifth insulating layers INS1 to INS5 may be stacked on a substrate 110. Lines of a display panel may include a plurality of line patterns disposed on different layers.

One or more driving circuits 20 may be disposed on the substrate 110. The driving circuit 20 may be at least partially covered with a first insulating layer INS1. A first line pattern M1 may be disposed on the first insulating layer INS1. The first insulating layer INS1 may be provided as a single insulating layer or a plurality of insulating layers. The second insulating layer INS2 includes contact holes exposing output terminals of the driving circuits 20 and/or the first line pattern M1. A second line pattern M2 may be disposed on the second insulating layer INS2. A portion of the second line pattern M2 may be in contact with the output terminal of the driving circuit 20 and/or the first line pattern M1 through the contact holes passing through the second insulating layer INS2. The third insulating layer INS3 may include contact holes that expose a portion of the second line pattern M2. A third line pattern M3 may be disposed on the third insulating layer INS3. A portion of the third line pattern M3 may be in contact with the second line pattern M2 through the contact holes passing through the third insulating layer INS3.

For example, each of the first insulating layer INS1, the second insulating layer INS2 and the third insulating layer INS3 may be formed by inorganic film in a single layer or in multiple layers, for example, the inorganic film in a single layer may be a silicon oxide (SiOx) film or a silicon nitride (SiNx) film, and inorganic films in multiple layers may formed by alternately stacking one or more silicon oxide (SiOx) films, one or more silicon nitride (SiNx) films, and one or more amorphous silicon (a-Si), but the present disclosure is not limited thereto.

The fourth insulating layer INS4 may include contact holes that expose a portion of the third line pattern M3. A fourth line pattern M4 may be disposed on the fourth insulating layer INS4. A portion of the fourth line pattern M4 may be in contact with the third line pattern M3 through the contact holes passing through the fourth insulating layer INS4. The fifth insulating layer INS5 may include contact holes that expose a portion of the fourth line pattern M4. A fifth line pattern M5 may be disposed on the fifth insulating layer INS5. A portion of the fifth line pattern M5 may be in contact with the fourth line pattern M4 through the contact holes passing through the fifth insulating layer INS5.

For example, each of the fourth insulating layer INS4 and the fifth insulating layer INS5 may be formed by inorganic film in a single layer or in multiple layers, for example, the inorganic film in a single layer may be a silicon oxide (SiOx) film or a silicon nitride (SiNx) film, and inorganic films in multiple layers may formed by alternately stacking one or more silicon oxide (SiOx) films, one or more silicon nitride (SiNx) films, and one or more amorphous silicon (a-Si), but the present disclosure is not limited thereto.

Hereinafter, a configuration for increasing the output luminance of a display device 100 similarly to a nonlinear gamma curve will be described.

Figure 11:
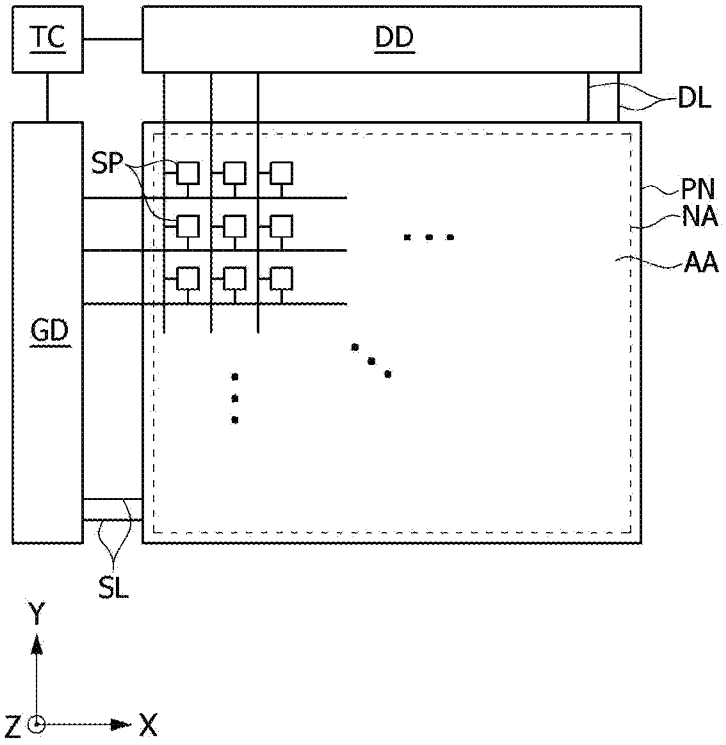
FIG. 11 is a schematic view illustrating a configuration of a display device according to one example embodiment of the present disclosure.

FIG. 11 is a schematic view illustrating a configuration of a display device according to one example embodiment of the present disclosure.

Referring to FIG. 11, the display device includes a display panel PN in which a plurality of pixels are disposed in a display area AA, and a driving circuit that drives the pixels.

The display panel PN may be a panel with a rectangular structure having a length in an X-axis direction, a width in a Y-axis direction, and a thickness in a Z-axis direction. However, the present disclosure is not limited thereto. The display panel PN may be a panel with a rectangular structure having a length in an Y-axis direction, a width in a X-axis direction, and a thickness in a Z-axis direction. The pixels include a plurality of subpixels SP with different colors. The driving circuit includes a data driver DD, a gate driver GD, and a timing controller TC that controls the gate driver GD and the data driver DD. The display area AA of the display panel PN, on which an input image is displayed, may be a screen visible from the front of the display panel PN.

An input image is displayed on the subpixels SP disposed in the display area AA of the display panel PN. Each of the subpixels SP includes a light-emitting element and a driving circuit that drives the light-emitting element. The light-emitting element may be a light-emitting diode (LED) or a micro-light-emitting diode (micro-LED).

On the display panel PN, a plurality of scan lines SL and a plurality of data lines DL are disposed to intersect each other. Each of the subpixels SP is connected to the scan line SL and the data line DL. Power lines omitted in FIG. 1 may be connected to each of the subpixels SP. In the display panel PN, a non-display area NA may be disposed outside the display area AA.

A plurality of subpixels SP for image display may be disposed in the display area AA. The non-display area NA may include a pad area positioned at at least one side of the display area AA in a column direction.

In the display panel PN according to example embodiments of the disclosure, the non-display area NA may be very small. In the disclosure, the non-display area NA may also be referred to as a "bezel." For example, the non-display area NA may include a first non-display area, a second non-display area, a third non-display area, and a fourth non-display area. The first non-display area may be positioned outside the display area AA in the column direction. The second non-display area may be positioned outside the display area AA in the row direction. The third non-display area may be positioned outside the display area AA in the column direction and may be positioned opposite to the first non-display area. The fourth non-display area may be positioned outside the display area AA in the row direction and may be positioned opposite to the second non-display area. The first non-display area among the first to fourth non-display areas may include a pad area where the data driving circuit is connected or bonded. Among the first to fourth non-display areas, the second to fourth non-display areas including no pad area may have a very small size, but example embodiments of the disclosure are not limited thereto.

As another example, the boundary area between the display area AA and the non-display area NA may be bent so that the non-display area NA may be positioned under the display area AA. In this case, no or little change may be made to the non-display area NA shown to the user when the user views the display panel from the front, but exemplary embodiments of the disclosure are not limited thereto.

The gate driver GD supplies scan signals to the scan lines SL in response to a gate control signal provided from the timing controller TC. The gate driver GD may be disposed in the non-display area NA of the display panel PN or in the display area AA.

In response to a data control signal provided from the timing controller TC, the data driver DD converts image data received from the timing controller TC into a reference compensation voltage to output a data voltage. The data voltage output from the data driver DD is supplied to the data lines DL.

The timing controller TC arranges image data input from the outside and supplies the image data to the data driver DD. The timing controller TC may generate a gate control signal and a data control signal based on a timing signal synchronized with an input image signal, for example, a dot clock signal, a data enable signal, and a horizontal/vertical synchronization signal. Here, the horizontal synchronization signal is a signal representing a time taken to display one horizontal line of a screen and the vertical synchronization signal is a signal representing a time taken to display a screen of one frame. The data enable signal may correspond to a signal indicating a period for which a data voltage is supplied to the pixel. The timing controller TC supplies the gate control signal to the gate driver GD and supplies the data control signal to the data driver DD to control an operation timing of the gate driver GD and the data driver DD.

In one example embodiment, the timing controller TC may time-divide a unit frame period, which is a period for displaying one image, into a plurality of subframes.

The timing controller TC unequally sets a pulse width modulation (PWM) for pulse width of each of one or more subframes corresponding to one pixel gray level value, which is a gray level value of one pixel data included in an input image data, thereby allowing the output luminance of a display device 100 to nonlinearly increase.

The timing controller TC may allow a PWM pulse width for each subframe, which is set for each of one or more subframes, to be included in a gate control signal. The timing controller TC may supply the gate control signal to the gate driver GD.

By using the PWM pulse width for each subframe included in the gate control signal, the gate driver GD may supply an emission signal for each subframe, which is for causing the light-emitting element to emit light for each subframe, to the scan lines SL.

The timing controller TC may be implemented as a separate component from the data driving circuit, or the timing controller TC and the data driving circuit may be integrated into an integrated circuit (IC). However, the present disclosure is not limited thereto.

The timing controller TC may be a timing controller used in display technology, a control device that may perform other control functions as well as the functions of the timing control, or may be a circuit in the control device. The timing controller TC may be implemented as various circuits or electronic components, such as an integrated circuit (IC), a field programmable gate array (FPGA), an application specific integrated circuit (ASIC), or a processor, but is not limited thereto.

The timing controller TC may be mounted on a printed circuit board or a flexible printed circuit and may be electrically connected with the data driving circuit and the gate driving circuit through the printed circuit board or the flexible printed circuit.

The timing controller TC may transmit/receive signals to/from the data driving circuit according to one or more predetermined interfaces. The interface may include, e.g., a low voltage differential signaling (LVDS) interface, an embedded clock point-point interface (EPI), and a serial peripheral interface (SPI), but exemplary embodiments of the disclosure are not limited thereto. Similarly, the timing controller TC may transmit signals to, and receive signals from, the gate driving circuit via one or more predefined interfaces.

Figure 12:
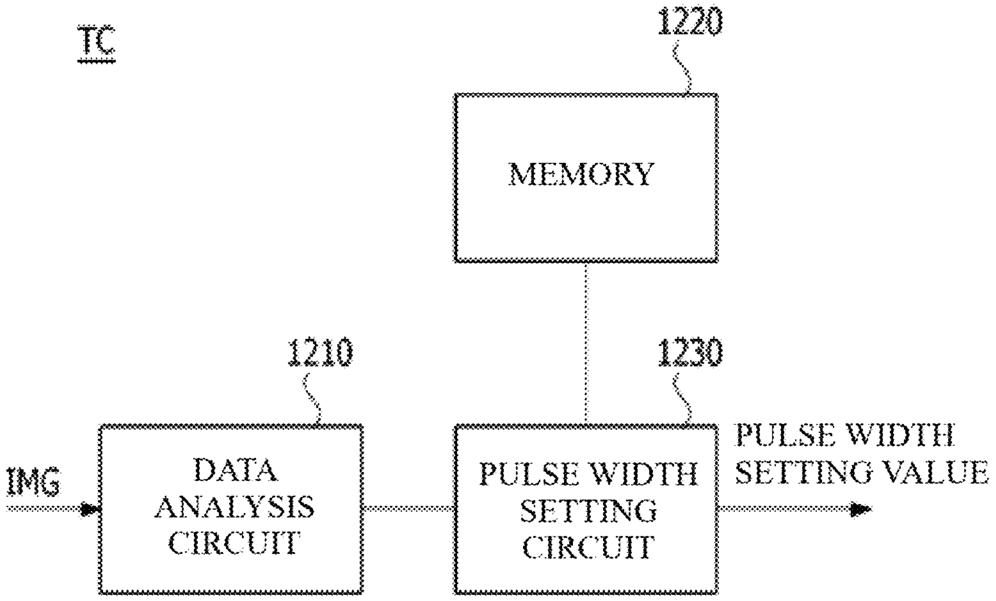
FIG. 12 is a diagram for describing a configuration of a timing controller according to one example embodiment of the present disclosure.

FIG. 12 is a diagram for describing a configuration of a timing controller according to one example embodiment of the present disclosure.

Referring to FIG. 12, a timing controller TC may include a data analysis circuit 1210, a memory 1220, and a pulse width setting circuit 1230.

The data analysis circuit 1210 may receive input image data IMG from a host (not shown) and may check a pixel gray level value which is a gray level value of one pixel data included in the input image data IMG.

The memory 1220 may store a plurality of pieces of subframe information obtained by time-dividing a unit frame period and a pulse width increase amount for each gray level value, which is preset for each gray level value included in the entire gray level range from the minimum gray level value to the maximum gray level value, in a lookup table.

For example, when the maximum gray level value is a 256 gray level, the lookup table may be formed in the following form.

TABLE 1

| Gray level value | Gray level section | Increase amount for each gray level value |
|---|---|---|
| 1 | First section | 0.2% |
| 2 | | 0.8% |
| 3 | | 1.5% |
| 4 | | 2.2% |
| 5 | | 3.0% |
| 6 | | 3.8% |
| 7 | | 4.7% |
| 8 | | 5.5% |
| 9 | | 6.4% |
| 10 | | 7.4% |
| 11 | | 8.3% |
| 12 | | 9.3% |
| 13 | | 10.2% |
| 14 | | 11.2% |
| 15 | | 12.2% |
| 16 | | 13.2% |
| 17 | Second section | 4.0% |
| 18 | | 4.3% |
| 19 | | 4.6% |
| 20 | | 4.8% |
| 21 | | 5.1% |
| 22 | | 5.5% |
| 23 | | 5.8% |
| 24 | | 6.1% |
| 25 | | 6.4% |
| 26 | | 6.7% |
| 27 | | 7.0% |
| 28 | | 7.3% |
| 29 | | 7.6% |
| 30 | | 8.0% |
| 31 | | 8.3 |
| 32 | | 8.6% |

TABLE 2

| Gray level value | Gray level section | Increase amount for each gray level value |
|---|---|---|
| 225 | Fifteenth section | 6.0% |
| 226 | | 6.0% |
| 227 | | 6.1% |
| 228 | | 6.1% |
| 229 | | 6.1% |
| 230 | | 6.2% |
| 231 | | 6.2% |
| 232 | | 6.2% |
| 233 | | 6.3% |
| 234 | | 6.3% |

TABLE 2-continued

| Gray level value | Gray level section | Increase amount for each gray level value |
|---|---|---|
| 235 | | 6.3% |
| 236 | | 6.4% |
| 237 | | 6.4% |
| 238 | | 6.4% |
| 239 | | 6.5% |
| 240 | | 6.5% |
| 241 | Sixteenth section | 6.0% |
| 242 | | 6.1% |
| 243 | | 6.1% |
| 244 | | 6.1% |
| 245 | | 6.1% |
| 246 | | 6.2% |
| 247 | | 6.2% |
| 248 | | 6.2% |
| 249 | | 6.3% |
| 250 | | 6.3% |
| 251 | | 6.3% |
| 252 | | 6.4% |
| 253 | | 6.4% |
| 254 | | 6.4% |
| 255 | | 6.4% |
| 256 | | 6.5% |

In the lookup table, the entire gray level range may be divided into a plurality of gray level sections. Each gray level section may include a plurality of gray level values. Here, the number of the plurality of gray level sections may be equal to the number of a plurality of subframes.

For example, when a unit frame is time-divided into 16 subframes, the entire gray level range from a 1 gray level, which is the minimum gray level value, to a 256 gray level which is the maximum gray level value may be divided into first to sixteenth sections as shown in Tables 1 and 2. In other words, the entire gray level range may be divided into 16 gray level sections.

Each gray level section may include 16 gray level values. In other words, a first section that is a first gray level section may include 16 gray level values from a 1 gray level to a 16 gray level, and a second section may include 16 gray level values from a 17 gray level to a 32 gray level. A fifteenth section may include 16 gray level values from a 225 gray level to a 240 gray level, and a sixteenth section that is a last section may include 16 gray level values from a 241 gray level to a 256 gray level.

Here, the largest gray level value in each gray level section may be a critical gray level value for each section. In other words, a critical gray level value for distinguishing a plurality of gray level sections may be set for each gray level section in such a manner that a first critical gray level value which is a critical gray level value of the first section is set to a 16 gray level, a second critical gray level value which is a critical gray level value of the second section is set to a 32 gray level, a fifteenth gray level value which is a critical gray level value of the fifteenth section is set to a 240 gray level, and a sixteenth critical gray level value which is a critical gray level value of the sixteenth section is set to a 256 gray level.

Referring to Table 1 and Table 2, it can be seen that, whenever a gray level value increases by 1 in each gray level section of the lookup table, a pulse width increase amount unequally increases. In particular, it can be clearly seen that a pulse width increase amount unequally increases as a gray level value increases by 1 in the first section including gray level values from the 1 gray level, which is the minimum gray level value, to the first critical gray level value. Here, a standard for a pulse width increase amount of each gray level section may be the maximum pulse width of each subframe.

For example, when the maximum pulse width of a unit frame is 16 ms, the maximum pulse width of each subframe may be 1 ms. When a pulse width increase amount corresponding to the 1 gray level in the first section in the lookup table is 0.2%, a pulse width corresponding to the 1 gray level may be 1 ms×0.002=2 μs.

When a pulse width increase amount corresponding to the 2 gray level in the first section in the lookup table is 0.8%, a pulse width corresponding to the 2 gray level may be 1 ms×0.008=8 μs.

When a pulse width increase amount corresponding to the 3 gray level in the first section in the lookup table is 1.5%, a pulse width corresponding to the 3 gray level may be 1 ms×0.015=15 μs.

When a pulse width increase amount corresponding to the 4 gray level in the first section in the lookup table is 2.2%, a pulse width corresponding to the 4 gray level may be 1 ms×0.022=22 μs.

When a pulse width increase amount corresponding to the 5 gray level in the first section in the lookup table is 3%, a pulse width corresponding to the 5 gray level may be 1 ms×0.03=30 μs.

As described above, it can be seen that, when a gray level value increases from the 1 gray level to the 2 gray level, a pulse width increases by 6 μs, when a gray level value increases from the 2 gray level to the 3 gray level, a pulse width increases by 7 μs, when a gray level value increases from the 3 gray level to the 4 gray level, a pulse width increases by 7 μs, and when a gray level value increases from the 4 gray level to the 5 gray level, a pulse width increases by 8 μs. In other words, it can be seen that a pulse width increase amount unequally increases whenever a gray level value increases by 1 in the first section.

In addition, it can be seen that a pulse width increase amount gradually increases as a gray level value in the first section approaches the first critical gray level value (16 gray level in Table 1). Here, the first section may correspond to a low gray level section.

A pulse width increase amount for each gray level value as described above may be calculated using the following equation.

$$dPW(\mathrm{Gray}) = \frac{\left(\frac{\mathrm{Gray}}{\mathrm{Gray}_{Max}}\right)^{Gamma} - \left(\frac{\mathrm{Gray}-1}{\mathrm{Gray}_{Max}}\right)^{Gamma}}{\left(\frac{\mathrm{Gray\_Tap}(n+1)}{\mathrm{Gray}_{Max}}\right)^{Gamma} - \left(\frac{\mathrm{Gray\_Tap}(n)}{\mathrm{Gray}_{Max}}\right)^{Gamma}} \quad \text{Equation 1}$$

Here, "Gray" denotes a target gray level value of which a pulse width increase amount is to be calculated, "dPW (Gray)" denotes a pulse width increase amount of the target gray level value, "$\mathrm{Gray}_{Max}$" denotes the maximum gray level value, Gamma denotes a gamma curve value, "Gray−1" denotes a gray level value that is smaller than the target gray level value by a 1 gray level, "Gray_Tap(n+1)" denotes a critical gray level value of a gray level section including the target gray level value, and "Gray_Tap(n)" denotes a critical gray level value of a gray level section that is lower than the gray level section including the target gray level value.

For example, when the maximum gray level value is a 256 gray level and the target gray level value is a 32 gray level that is the second critical gray level value, a gray level value that is smaller than the target gray level value by a 1 gray level is a 31 gray level, and the critical gray level value of the gray level section including the target gray level value is a 32 gray level. The critical gray level value of the gray level section that is lower than the gray level section including the target gray level value is a 16 gray level that is the first critical gray level value. When this is substituted into Equation 1 above, a pulse width increase dPW (32)=$(32/256)^{2.2}-(31/256)^{2.2}/(32/256)^{2.2}-(16/256)^{2.2} \approx =0.0103-0.0097/0.0103-0.0023 \approx 8.6\%$. In other words, a pulse width increase amount of a 32 gray level may be 8.6%.

The lookup table may be stored in a memory 1220 during a manufacturing process of a display device.

The pulse width setting circuit 1230 may unequally set a PWM pulse width of each of one or more subframes corresponding to one pixel gray level value confirmed by the data analysis circuit 1210.

Specifically, the pulse width setting circuit 1230 may read one or more pulse width increase amounts, which correspond to one or more gray level values included in a range from the minimum gray level value to one pixel gray level value, from the lookup table.

For example, when one pixel gray level value is a 1 gray level, one or more gray level values may be a 1 gray level. In the lookup table such as Table 1, a pulse width increase amount corresponding to a 1 gray level may be 0.2%.

As another example, when one pixel gray level value is a 2 gray level, one or more gray level values may be a 1 gray level and a 2 gray level. In the lookup table such as Table 1, the pulse width increase amount corresponding to a 1 gray level may be 0.2% or 0.8%.

The pulse width setting circuit 1230 may set a PWM pulse width of each of one or more subframes corresponding to one pixel gray level value using the one or more pulse width increase amounts read as described above. In other words, the PWM pulse width for each subframe corresponding to one pixel gray level value may be set.

Figure 13:
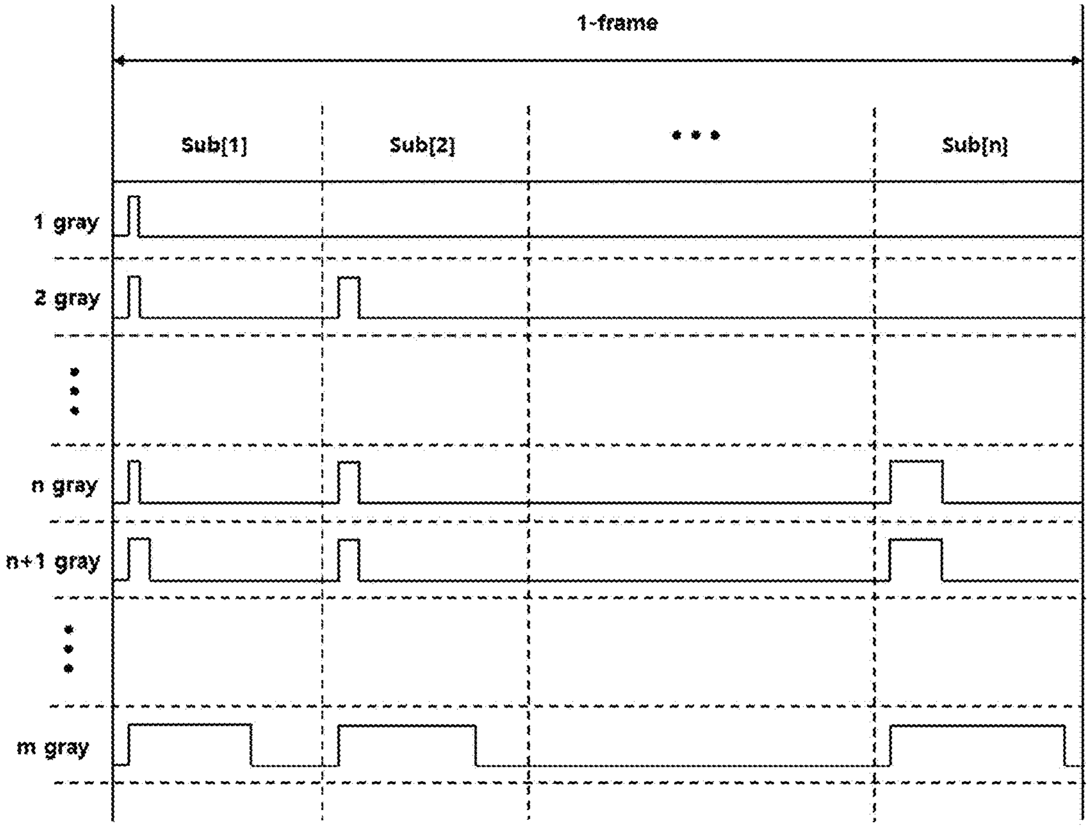
FIG. 13 is a diagram for describing a configuration for setting a pulse width modulation (PWM) pulse width for each subframe for a plurality of gray level values in a pulse width setting circuit of a timing controller according to one example embodiment of the present disclosure.

For example, when one or more pulse width increase amounts are 0.2% corresponding to a 1 gray level, the pulse width setting circuit 1230 may set a PWM pulse width corresponding to 0.2% in a first subframe Sub[1] as shown in FIG. 13.

For another example, when one or more pulse width increase amounts are 0.2% corresponding to the 1 gray level and 0.8% corresponding to the 2 gray level, as shown in FIG. 13, the pulse width setting circuit 1230 may set a PWM pulse width corresponding to 0.2% in the first subframe Sub[1] and a PWM pulse width corresponding to 0.8% in a second subframe Sub[2].

Here, when the maximum pulse width of each subframe is 1 ms, the pulse width setting circuit 1230 may set a pulse width of the first subframe Sub[1] corresponding to the 1 gray level to 2 μs (1 ms×0.002). A pulse width of the second subframe Sub[2] corresponding to the 2 gray level may be set to 8 μs (1 ms×0.008).

In one example embodiment, when a unit frame period is divided into n subframes (n is a natural number greater than or equal to 3), the pulse width setting circuit 1230 may set a PWM pulse width of each of n subframes corresponding to an n gray level in the above manner.

For an n+1 gray level, a pulse width corresponding to the n+1 gray level may be added to the PWM pulse width of the first subframe Sub[1] set for the n gray level to set a PWM pulse width for each subframe for the n+1 gray level.

For example, when a unit frame period is divided into 16 subframes and the maximum pulse width of each subframe is 1 ms, the pulse width setting circuit 1230 may set a PWM pulse width of each of the 16 subframes corresponding to a 16 gray level in the above manner. Here, a pulse width of a sixteenth subframe corresponding to the 16 gray level may be 1 ms×0.132=132 μs.

For a 17 gray level, a pulse width of 40 μs corresponding to the 17 gray level may be added to 2 μs, which is the PWM pulse width of the first subframe Sub[1] set for the 16 gray level, to set a PWM pulse width for each subframe for the 17 gray level.

The pulse width setting circuit 1230 may set a PWM pulse width for each subframe for an m gray level which is the maximum gray level value in the above manner.

In one example embodiment, the pulse width setting circuit 1230 may set a PWM pulse width of each of one or more subframes unequally for each subframe.

Figure 14:
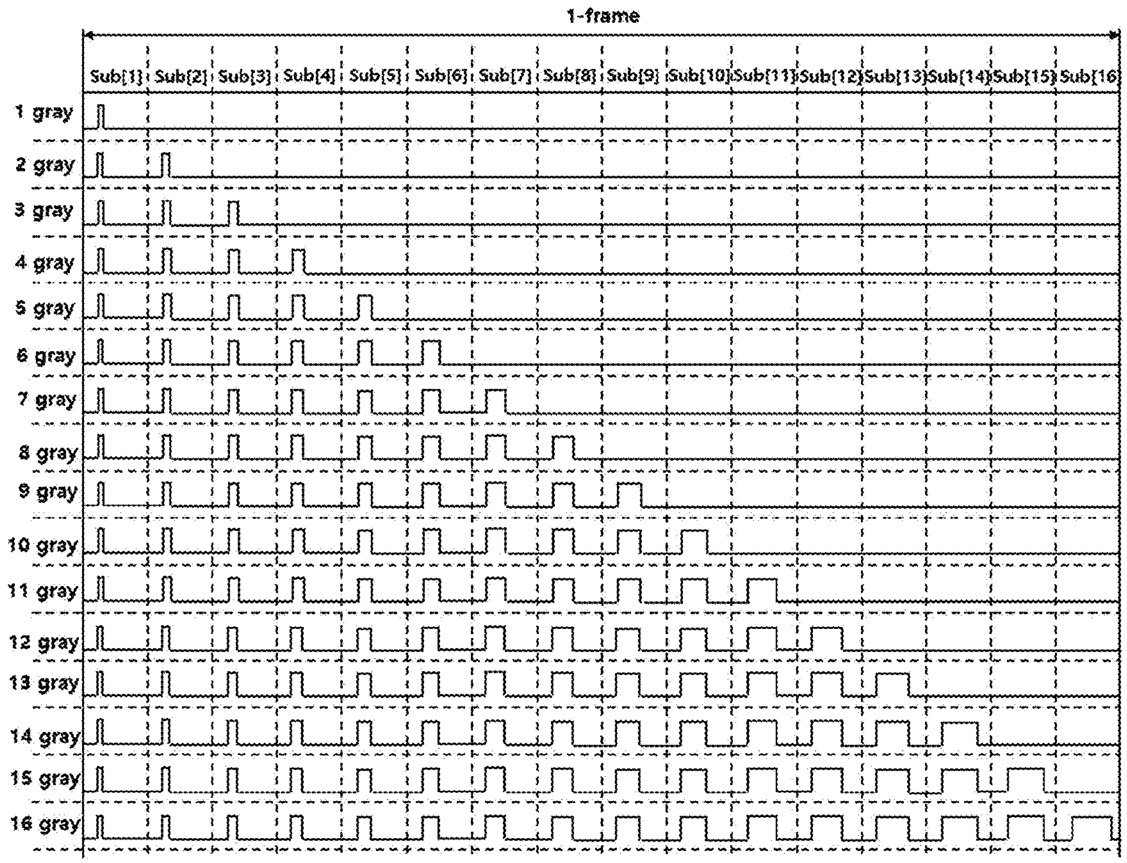
FIG. 14 is a diagram for describing a configuration in which a pulse width setting circuit according to one example embodiment of the present disclosure sets a PWM pulse width for each subframe for gray level values in a low gray level section.

For example, in a case in which a unit frame period is divided into 16 subframes as shown in FIG. 14, when the pulse width setting circuit 1230 sets a PWM pulse width of each subframe from a 1 gray level to a 16 gray level included in a first section, the pulse width setting circuit 1230 may unequally set a PWM pulse width of each of first to sixteenth subframes Sub[1] according to an unequal pulse width increase amount for each gray level value of the lookup table such as Table 1.

Figure 15:
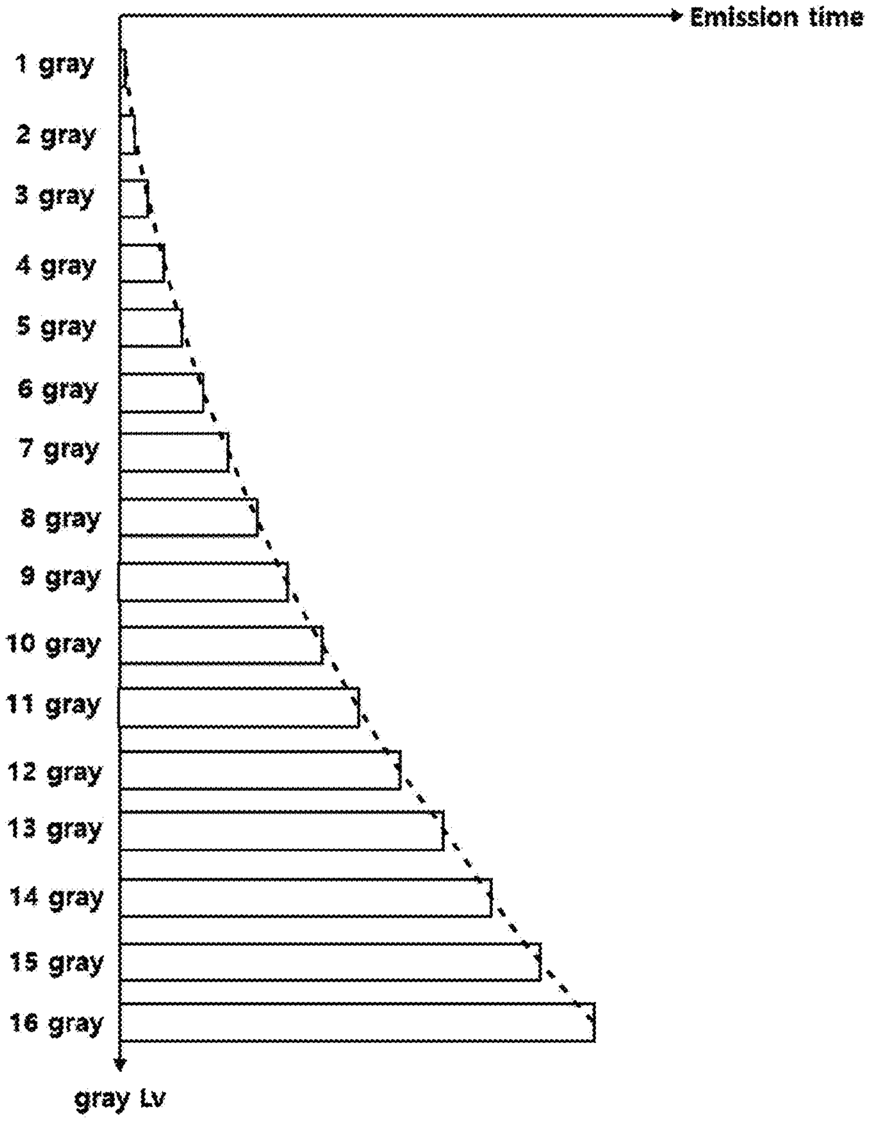
FIG. 15 is a graph exemplarily showing an emission time for each gray level value calculated by accumulating a PWM pulse width for each subframe for gray level values in a low gray level section.

As described above, when the pulse width setting circuit 1230 sets a PWM pulse width of each subframe unequally for each subframe, an emission time for each gray level in a low gray level section may nonlinearly increase as shown in FIG. 15. Here, luminance may increase as an emission time increases.

Figure 16:
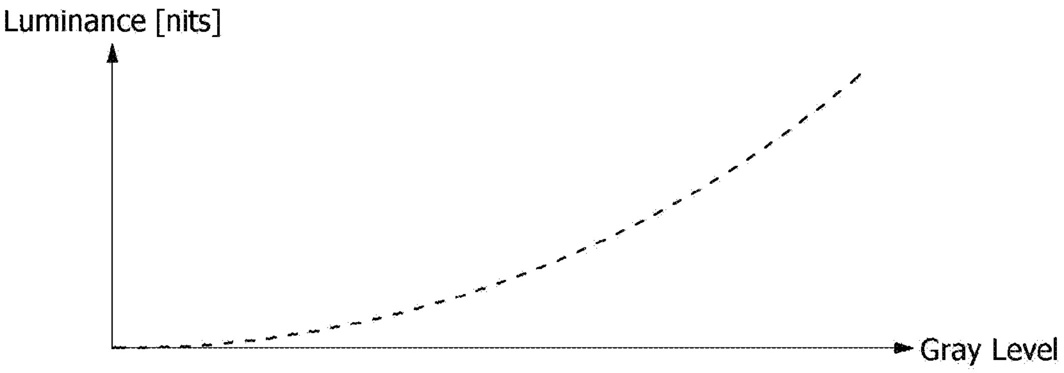
FIG. 16 is a graph exemplarily showing a gamma curve set in a display device according to one example embodiment of the present disclosure.

As shown in FIG. 15, the nonlinearity of an emission time for each gray level may be similar to a gamma curve in which luminance nonlinearly increases as a gray level increases as shown in FIG. 16.

Figure 17:
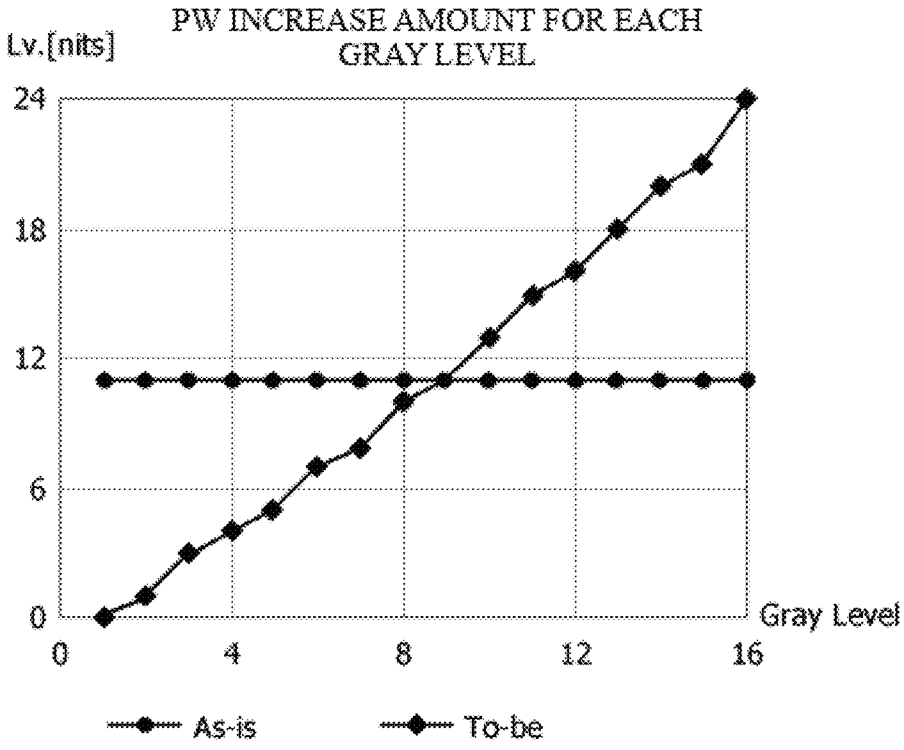
FIG. 17 is a graph for describing a comparison between pulse width increase amounts for each gray level of a method of setting a PWM pulse width for each subframe according to one example embodiment of the present disclosure and an existing method.

In addition, in one example embodiment, as shown in FIG. 17, it can be confirmed that a pulse width increase amount gradually increases as a gray level value in a low gray level section increases to a specific gray level value (for example, a 16 gray level in FIG. 17).

In contrast, in an existing method, since a PWM pulse width of each subframe is equally set, it can be confirmed that a pulse width increase amount for each gray level is constant.

Figure 18:
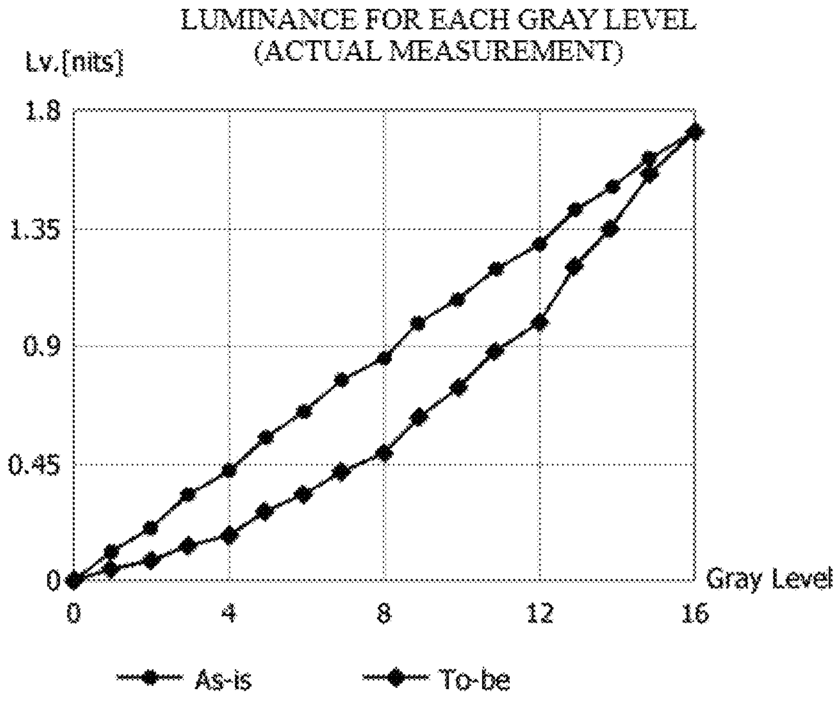
FIG. 18 is a graph for describing a comparison between output luminances for each gray level of a method of setting a PWM pulse width for each subframe according to one example embodiment of the present disclosure and an existing method.

Thus, it can be confirmed that output luminance for each gray level of a display device linearly increases in an existing method as shown in FIG. 18.

In contrast, in one example embodiment, it can be confirmed that output luminance for each gray level of a display device nonlinearly increases similarly to a gamma curve. In other words, in one example embodiment, the display device may more accurately express a gray level value of pixel data.

In the above, it has been described that the lookup table including a pulse width increase amount for each gray level value is stored in the memory 1220, and the pulse width setting circuit 1230 sets a PWM pulse width of each of one or more subframes corresponding to one pixel gray level value using the lookup table, but example embodiment may not be limited thereto.

In other words, the lookup table may not be stored in the memory 1220, and by using Equation 1, the pulse width setting circuit 1230 may calculate one pixel gray level value and a pulse width increase amount for each of grays values that are lower than the one pixel gray level value. Here, the pulse width setting circuit 1230 may divide the entire gray level range from the minimum gray level value to the maximum gray level value into a plurality of gray level section and may set a critical gray level value for distinguishing the plurality of gray level sections for each gray level section.

The pulse width setting circuit 1230 may set a PWM pulse width of each of one or more subframes corresponding to one pixel gray level value using each calculated pulse width increase amount.

For example, when one pixel gray level value is a 2 gray level and the maximum pulse width of each subframe is 1 ms, the pulse width setting circuit 1230 may calculate a pulse width increase amount (0.2%) of a 1 gray level and a pulse width increase amount (0.8%) of a 2 gray level using Equation 1.

The pulse width setting circuit 1230 may set a pulse width of the first subframe Sub[1] corresponding to the 1 gray level to 2 μs (1 ms×0.002) using the pulse width increase amount (0.2%) of the 1 gray level and the pulse width increase amount (0.8%) of the 2 gray level. A pulse width of the second subframe Sub[2] corresponding to the 2 gray level may be set to 8 μs (1 ms×0.008).

In one or more example embodiments, a timing controller comprises a memory configured to store a plurality of subframe information obtained by time-dividing a unit frame period, a data analysis circuit configured to receive input image data from a host and check one pixel gray value which is a gray level value of one pixel data included in the input image data; and a pulse width setting circuit configured to set a pulse width modulation (PWM) pulse width of each of one or more subframes corresponding to the one pixel gray value unequally per each subframe.

In one or more example embodiments, a display device comprises a gate driver configured to supply a scan signal to scan lines of a display panel in response to a gate control signal; and a timing controller configured to time-divide a unit frame period, which is a period for displaying one image, into a plurality of subframes, unequally set a pulse width modulation (PWM) pulse width of each of one or more subframes, which corresponds to one pixel gray level value data which is a gray level value of one pixel data included in input image data received from the outside, and allow the PWM pulse width for each subframe set for each of the one or more subframes to be included in the gate control signal to supply the PWM pulse width to the gate driver.

In some example embodiments, the memory is configured to store the plurality of subframe information and a pulse width increase amount for preset gray level values in a lookup table.

In some example embodiments, the preset gray level values are set for an entire gray level ranges from a first gray level which is a minimum gray level value to an N-th gray level which is a maximum gray level value, wherein N is a natural number greater than or equal to 2.

In some example embodiments, the pulse width setting circuit is configured to read one or more pulse width increase amounts corresponding to one or more gray level values included in a range from a minimum gray level value to one pixel gray level value, from the lookup table.

In some example embodiments, the pulse width setting circuit is configured to set the PWM pulse width of each of the one or more subframes using the one or more pulse width increase amounts.

In some example embodiments, the entire gray level range is divided into a plurality of gray level sections in the lookup table, a first gray level section among the plurality of gray level sections includes gray level values from the minimum gray level value to a first critical gray level value, and in the first section, a pulse width increase amount unequally increases whenever a gray level value increases by 1

In some example embodiments, the pulse width increase amount gradually increases as the gray level value in the first section approaches the first critical gray level value.

In some example embodiments, an emission time for each gray level in a low gray level section is non-linearly increased according to the unequal increase of the pulse width increase amount.

In some example embodiments, wherein the pulse width setting circuit is configured to calculate one pixel gray level value and a pulse width increase amount for each of grays values that are lower than the one pixel gray level value using a following equation 1:

$$dPW(\text{Gray}) = \frac{\left(\frac{\text{Gray}}{\text{Gray}_{Max}}\right)^{Gamma} - \left(\frac{\text{Gray}-1}{\text{Gray}_{Max}}\right)^{Gamma}}{\left(\frac{\text{Gray\_Tap}(n+1)}{\text{Gray}_{Max}}\right)^{Gamma} - \left(\frac{\text{Gray\_Tap}(n)}{\text{Gray}_{Max}}\right)^{Gamma}}$$

wherein, "Gray" denotes a target gray level value of which the pulse width increase amount is to be calculated, "dPW (Gray)" denotes a pulse width increase amount of the target gray level value, "$\text{Gray}_{Max}$" denotes the maximum gray level value, "Gamma" denotes a gamma curve value, "Gray−1" denotes a gray level value that is smaller than the target gray level value by one gray level, "Gray_Tap(n+1)" denotes a critical gray level value of a gray level section including the target gray level value, and "Gray_Tap(n)" denotes a critical gray level value of a gray level section that is lower than the gray level section including the target gray level value In some example embodiments, the pulse width setting circuit is configured to divide an entire gray level range from a minimum gray level value to a maximum gray level value into a plurality of gray level sections, and set a critical gray level value for distinguishing the plurality of gray level sections for each gray level section.

As described above, according to the present embodiment, a timing controller unequally sets a PWM pulse width of each of one or more subframes corresponding to a gray level value of pixel data, thereby allowing the output luminance of a display device to increase similarly to a non-linear gamma curve. Thus, a display device can accurately express a gray level value of pixel data.

The various advantageous advantages and effects of the examples are not limited to the above-described contents, and may be more readily understood in the course of describing a specific embodiment of the present disclosure.

The objects to be achieved by the disclosure, the means for achieving the objects, and the contents of the disclosure described in the effects described above do not specify essential features of the claims, and thus the scope of the claims is not limited by the matters described in the contents of the disclosure.

Although embodiments of the present disclosure have been described in more detail with reference to the accompanying drawings, the present disclosure is not necessarily limited to these embodiments, and various modifications may be made without departing from the technical spirit of the present disclosure. Accordingly, the embodiments disclosed in the present disclosure are not intended to limit the technical idea of the present disclosure, but are for illustrative purposes, and the scope of the technical idea of the present disclosure is not limited by these embodiments. Accordingly, it should be understood that the above-described embodiments are exemplary in all respects and not restrictive.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A timing controller comprising:

a memory configured to store a plurality of subframe information obtained by time-dividing a unit frame period;

a data analysis circuit configured to receive input image data from a host and check one pixel gray value which is a gray level value of one pixel data included in the input image data; and a pulse width setting circuit configured to set a pulse width modulation (PWM) pulse width of each of one or more subframes corresponding to the one pixel gray value unequally per each subframe, wherein the memory is configured to further store a pulse width increase amount for preset gray level values in a lookup table, and wherein the pulse width increase amount gradually increases as a gray level value in a low gray level section increases to a specific gray level value.

2. The timing controller of claim 1, wherein the preset gray level values are set for an entire gray level ranges from a first gray level which is a minimum gray level value to an N-th gray level which is a maximum gray level value, wherein N is a natural number greater than or equal to 2.

3. The timing controller of claim 1, wherein the pulse width setting circuit is configured to read one or more pulse width increase amounts corresponding to one or more gray level values included in a range from a minimum gray level value to one pixel gray level value, from the lookup table.

4. The timing controller of claim 3, wherein the pulse width setting circuit is configured to set the PWM pulse width of each of the one or more subframes using the one or more pulse width increase amounts.

5. The timing controller of claim 2, wherein the entire gray level range is divided into a plurality of gray level sections in the lookup table, wherein a first gray level section among the plurality of gray level sections includes gray level values from the minimum gray level value to a first critical gray level value, and wherein, in the first gray level section, a pulse width increase amount unequally increases whenever a gray level value increases by 1.

6. The timing controller of claim 5, wherein the pulse width increase amount gradually increases as the gray level value in the first gray level section approaches the first critical gray level value.

7. The timing controller of claim 5, wherein an emission time for each gray level in a low gray level section is non-linearly increased according to the unequal increase of the pulse width increase amount.

8. A timing controller comprising:

a memory configured to store a plurality of subframe information obtained by time-dividing a unit frame period;

a data analysis circuit configured to receive input image data from a host and check one pixel gray value which is a gray level value of one pixel data included in the input image data; and a pulse width setting circuit configured to set a pulse width modulation (PWM) pulse width of each of one or more subframes corresponding to the one pixel gray value unequally per each subframe, wherein the pulse width setting circuit is configured to calculate one pixel gray level value and a pulse width increase amount for each of grays values that are lower than the one pixel gray level value using a following equation:

$$dPW(\text{Gray}) = \frac{\left(\frac{\text{Gray}}{\text{Gray}_{Max}}\right)^{Gamma} - \left(\frac{\text{Gray}-1}{\text{Gray}_{Max}}\right)^{Gamma}}{\left(\frac{\text{Gray\_Tap}(n+1)}{\text{Gray}_{Max}}\right)^{Gamma} - \left(\frac{\text{Gray\_Tap}(n)}{\text{Gray}_{Max}}\right)^{Gamma}}$$

wherein, "Gray" denotes a target gray level value of which the pulse width increase amount is to be calculated, "dPW(Gray)" denotes a pulse width increase amount of the target gray level value, "$\text{Gray}_{Max}$" denotes the maximum gray level value, "Gamma" denotes a gamma curve value, "Gray−1" denotes a gray level value that is smaller than the target gray level value by one gray level, "Gray_Tap(n+1)" denotes a critical gray level value of a gray level section including the target gray level value, and "Gray_Tap(n)" denotes a critical gray level value of a gray level section that is lower than the gray level section including the target gray level value.

9. The timing controller of claim 8, wherein the pulse width setting circuit is configured to:

divide an entire gray level range from a minimum gray level value to a maximum gray level value into a plurality of gray level sections; and set a critical gray level value for distinguishing the plurality of gray level sections for each gray level section.

10. A display device comprising:

a gate driver configured to supply a scan signal to scan lines of a display panel in response to a gate control signal; and a timing controller configured to time-divide a unit frame period, which is a period for displaying one image, into a plurality of subframes, unequally set a pulse width modulation (PWM) pulse width of each of one or more subframes, which corresponds to one pixel gray level value data which is a gray level value of one pixel data included in input image data received, and allow the PWM pulse width for each subframe set for each of the one or more subframes to be included in the gate control signal to supply the PWM pulse width to the gate driver, wherein the timing controller includes:

a memory configured to store a plurality of subframe information obtained by time-dividing a unit frame period;

a data analysis circuit configured to receive input image data from a host and check one pixel gray value which is a gray level value of one pixel data included in the input image data; and a pulse width setting circuit configured to set a pulse width modulation (PWM) pulse width of each of one or more subframes corresponding to the one pixel gray value unequally per each subframe, wherein the memory is configured to further store a pulse width increase amount for preset gray level values in a lookup table, and wherein the pulse width increase amount gradually increases as a gray level value in a low gray level section increases to a specific gray level value.

11. The display device of claim 10, wherein the preset gray level values are set for an entire gray level ranges from a first gray level which is a minimum gray level value to an N-th gray level which is a maximum gray level value, wherein N is a natural number greater than or equal to 2.

12. The display device of claim 10, wherein the pulse width setting circuit is configured to read one or more pulse width increase amounts corresponding to one or more gray level values included in a range from a minimum gray level value to one pixel gray level value, from the lookup table.

13. The display device of claim 12, wherein the pulse width setting circuit is configured to set the PWM pulse width of each of the one or more subframes using the one or more pulse width increase amounts.

14. The display device of claim 11, wherein the entire gray level range is divided into a plurality of gray level sections in the lookup table, wherein a first gray level section among the plurality of gray level sections includes gray level values from the minimum gray level value to a first critical gray level value, and wherein, in the first gray level section, a pulse width increase amount unequally increases whenever a gray level value increases by 1.

15. The display device of claim 14, wherein the pulse width increase amount gradually increases as the gray level value in the first gray level section approaches the first critical gray level value.

16. The display device of claim 14, wherein an emission time for each gray level in a low gray level section is non-linearly increased according to the unequal increase of the pulse width increase amount.

17. The display device of claim 10, wherein the pulse width setting circuit is configured to calculate one pixel gray level value and a pulse width increase amount for each of grays values that are lower than the one pixel gray level value using a following equation:

$$dPW(\text{Gray}) = \frac{\left(\frac{\text{Gray}}{\text{Gray}_{Max}}\right)^{Gamma} - \left(\frac{\text{Gray}-1}{\text{Gray}_{Max}}\right)^{Gamma}}{\left(\frac{\text{Gray\_Tap}(n+1)}{\text{Gray}_{Max}}\right)^{Gamma} - \left(\frac{\text{Gray\_Tap}(n)}{\text{Gray}_{Max}}\right)^{Gamma}}$$

wherein, "Gray" denotes a target gray level value of which the pulse width increase amount is to be calculated, "dPW(Gray)" denotes a pulse width increase amount of the target gray level value, "$\text{Gray}_{Max}$" denotes the maximum gray level value, "Gamma" denotes a gamma curve value, "Gray−1" denotes a gray level value that is smaller than the target gray level value by one gray level, "Gray_Tap(n+1)" denotes a critical gray level value of a gray level section including the target gray level value, and "Gray_Tap(n)" denotes a critical gray level value of a gray level section that is lower than the gray level section including the target gray level value.

* * * * *